United States Patent
Hattori et al.

(10) Patent No.: US 10,694,196 B2
(45) Date of Patent: Jun. 23, 2020

(54) REPRODUCTION DEVICE, REPRODUCTION METHOD, AND PROGRAM

(71) Applicant: Sony Corporation, Tokyo (JP)

(72) Inventors: Shinobu Hattori, Tokyo (JP); Kazuo Yamamoto, Chiba (JP)

(73) Assignee: Sony Corporation

( * ) Notice: Subject to any disclaimer, the term of this patent is extended or adjusted under 35 U.S.C. 154(b) by 0 days.

(21) Appl. No.: 16/561,720

(22) Filed: Sep. 5, 2019

(65) Prior Publication Data

US 2019/0394473 A1     Dec. 26, 2019

Related U.S. Application Data

(63) Continuation of application No. 15/562,068, filed as application No. PCT/JP2015/061581 on Apr. 15, 2015, now Pat. No. 10,455,240.

(51) Int. Cl.
*H04N 9/70* (2006.01)
*H04N 19/186* (2014.01)
(Continued)

(52) U.S. Cl.
CPC ........... *H04N 19/186* (2014.11); *G11B 31/00* (2013.01); *H04N 5/85* (2013.01); *H04N 9/64* (2013.01);
(Continued)

(58) Field of Classification Search
CPC ........ H04N 21/816; H04N 21/43; H04N 9/64; H04N 19/186; H04N 5/85; H04N 9/79;
(Continued)

(56) References Cited

U.S. PATENT DOCUMENTS

2007/0133021 A1* 6/2007 Lee ................ H04N 9/67
358/1.9
2010/0135634 A1 6/2010 Ito et al.
(Continued)

FOREIGN PATENT DOCUMENTS

EP     3013041 A1    4/2016
JP     2009038685 A  2/2009
(Continued)

OTHER PUBLICATIONS

International Search Report from PCT/JP2015/061581, dated Jun. 30, 2015 (3 pgs.).
(Continued)

*Primary Examiner* — Robert Chevalier
(74) *Attorney, Agent, or Firm* — Lerner, David, Littenberg, Krumholz & Mentlik, LLP

(57) ABSTRACT

The present technology relates to a reproduction device, a reproduction method, and a program which are capable of transferring information about a color gamut and a dynamic range of luminance of a content recorded in a recording medium to a display device.
A reproduction device of the present technology includes: a readout unit configured to read out, from a recording medium recording a content, a file of a video stream and a file of reproduction management information used for reproducing the video stream and including monitor information indicating at least one of a color gamut and a dynamic range of luminance of a master monitor used for authoring the video stream; a decoding unit configured to decode the video stream; and an output unit configured to control an output of video data obtained by decoding the video stream and the monitor information included in the reproduction management information to a display device, depending on a
(Continued)

performance of the display device to which the content is output. The present technology can be applied to a player that reproduces a content.

15 Claims, 44 Drawing Sheets

(51) Int. Cl.
| | | |
|---|---|---|
| *G11B 31/00* | (2006.01) | |
| *H04N 9/64* | (2006.01) | |
| *H04N 21/81* | (2011.01) | |
| *H04N 5/85* | (2006.01) | |
| *H04N 21/43* | (2011.01) | |
| *H04N 5/765* | (2006.01) | |
| *G11B 20/10* | (2006.01) | |

(52) U.S. Cl.
CPC ........... *H04N 21/43* (2013.01); *H04N 21/816* (2013.01); *G11B 2020/10537* (2013.01); *G11B 2220/2541* (2013.01)

(58) Field of Classification Search
CPC ............ G11B 31/00; G11B 2220/2541; G11B 2020/10537; G09G 2320/08; G09G 2370/04; G09G 2370/042; G06F 3/1423
USPC ................ 386/314, 232, 263, 264, 300, 307
See application file for complete search history.

(56) References Cited

U.S. PATENT DOCUMENTS

| | | |
|---|---|---|
| 2010/0157154 A1 | 6/2010 | Kobayashi et al. |
| 2014/0078165 A1 | 3/2014 | Messmer et al. |
| 2015/0015597 A1 | 1/2015 | Sano et al. |
| 2016/0100183 A1 | 4/2016 | Yamamoto et al. |
| 2016/0156965 A1* | 6/2016 | Oh ......................... H04N 19/46 |
| | | 725/116 |
| 2018/0146344 A1 | 5/2018 | Kwon et al. |

FOREIGN PATENT DOCUMENTS

| | | |
|---|---|---|
| JP | 2009058692 A | 3/2009 |
| JP | 2009089209 A | 4/2009 |
| JP | 2010118881 A | 5/2010 |
| JP | 2015019283 A | 1/2015 |
| WO | 2007125697 A1 | 11/2007 |
| WO | 2014203747 A1 | 12/2014 |
| WO | 2015005025 A1 | 1/2015 |

OTHER PUBLICATIONS

Extended European Search Report and Written Opinion for EP Application No. 15889176.2, dated Nov. 21, 2018.

* cited by examiner

FIG. 5

| Syntax | No. of bits | Mnemonic |
|---|---|---|
| index.bdmv { | | |
|   type_indicator | 8*4 | bslbf |
|   version_number | 8*4 | bslbf |
|   Indexes_start_address | 32 | uimsbf |
|   ExtensionData_start_address | 32 | uimsbf |
|   reserved_for_future_use | 192 | bslbf |
|   AppInfoBDMV() | | |
|   for (i=0; i<N1; i++) { | | |
|     padding_word | 16 | bslbf |
|   } | | |
|   Indexes() | | |
|   for (i=0; i<N2; i++) { | | |
|     padding_word | 16 | bslbf |
|   } | | |
|   ExtensionData() | | |
|   for (i=0; i<N3; i++) { | | |
|     padding_word | 16 | bslbf |
|   } | | |
| } | | |

FIG. 6

| Syntax | No. of bits | Mnemonic |
|---|---|---|
| AppInfoBDMV() { | | |
| length | 32 | uimsbf |
| reserved_for_future_use | 1 | bslbf |
| initial_output_mode_preference | 1 | bslbf |
| SS_content_exist_flag | 1 | bslbf |
| reserved_for_future_use | 1 | bslbf |
| mastering_monitor_info | 4 | bslbf |
| video_format | 4 | bslbf |
| frame_rate | 4 | bslbf |
| content_provider_user_data | 8*32 | bslbf |
| } | | |

FIG. 7

| mastering_monitor_info | Meaning |
|---|---|
| 0 | reserved |
| 1 | Color Space: Unknown<br>Peak Luminance: Unknown<br>Black Luminance: Unknown |
| 2 | Color Space: ITU-R BT.709<br>Peak Luminance: Unknown<br>Black Luminance: Unknown |
| 3 | Color Space: DCI P3<br>Peak Luminance: Unknown<br>Black Luminance: Unknown |
| 4 | Color Space: ITU-R BT.2020<br>Peak Luminance: Unknown<br>Black Luminance: Unknown |
| 5 | Color Space: ITU-R BT.709<br>Peak Luminance: 1000 cd/m$^2$<br>Black Luminance: 0 cd/m$^2$ |
| 6 | Color Space: DCI P3<br>Peak Luminance: 1000 cd/m$^2$<br>Black Luminance: 0 cd/m$^2$ |
| 7 ~ 14 | ... |
| 15 | reserved |

FIG. 8

| Syntax | No. of bits | Mnemonic |
|---|---|---|
| Indexes() { | | |
|   length | 32 | uimsbf |
|   ... | | |
|   number_of_Titles | 16 | uimsbf |
|   for (title_id=0; | | |
|     title_id<number_of_Titles; | | |
|     title_id++) { | | |
|     Title[title_id]() { | | |
|       Title_object_type[title_id] | 2 | uimsbf |
|       Title_access_type[title_id] | 2 | uimsbf |
|       mastering_monitor_info | 4 | bslbf |
|       reserved_for_future_use | 24 | bslbf |

FIG. 9

| Syntax | No. of bits | Mnemonic |
|---|---|---|
| Indexes() { | | |
|   length | 32 | uimsbf |
|   ... | | |
|   number_of_Titles | 16 | uimsbf |
|   for (title_id=0; title_id<number_of_Titles; title_id++) { | | |
|     Title[title_id] () { | | |
|       Title_object_type[title_id] | 2 | uimsbf |
|       Title_access_type[title_id] | 2 | uimsbf |
|       mastering_monitor_color_primaries | 4 | bslbf |
|       mastering_monitor_luminance | 4 | bslbf |
|       reserved_for_future_use | 20 | bslbf |

FIG. 10

| mastering_monitor_color_primaries | Meaning |
|---|---|
| 0 | reserved |
| 1 | Color Space: Unknown |
| 2 | Color Space: ITU-R BT.709 |
| 3 | Color Space: DCI P3 |
| 4 | Color Space: ITU-R BT.2020 |
| 5 – 14 | ... |
| 15 | reserved |

FIG. 11

| mastering_monitor_luminance | Meaning |
|---|---|
| 0 | reserved |
| 1 | Peak Luminance: Unknown<br>Black Luminance: Unknown |
| 2 | Peak Luminance: 400cd/m²<br>Black Luminance: 0 cd/m² |
| 3 | Peak Luminance: 400 TO 800cd/m²<br>Black Luminance: 0 cd/m² |
| 4 | Peak Luminance: 800cd/m²<br>Black Luminance: 0 cd/m² |
| 5 | Peak Luminance: 800 TO 1000 cd/m²<br>Black Luminance: 0 cd/m² |
| 6 | Peak Luminance: 1000 cd/m²<br>Black Luminance: 0 cd/m² |
| 7 — 14 | ... |
| 15 | reserved |

FIG. 12

| Syntax | No. of bits | Mnemonic |
|---|---|---|
| ExtensionData() { | | |
|   length | 32 | uimsbf |
|   if(length !=0) { | | |
|     data_block_start_address | 32 | uimsbf |
|     reserved_for_word_align | 24 | bslbf |
|     number_of_ext_data_entries | 8 | uimsbf |
|     for (i=0; i<number_of_ext_data_entries; i++) { | | |
|       ext_data_entry() { | | |
|         ID1 | 16 | uimsbf |
|         ID2 | 16 | uimsbf |
|         ext_data_start_address | 32 | uimsbf |
|         ext_data_length | 32 | uimsbf |
|       } | | |
|     } | | |
|     for (i=0; i<L1; i++) { | | |
|       padding_word | 16 | bslbf |
|       padding_word | 16 | bslbf |
|     } | | |
|     data_block | 32 + 8*(length − data_block_start _address) | |
|   } | | |
| } | | |

FIG. 13

| ID1 | ID2 | Data in extension data entry | Stored in |
|---|---|---|---|
| 0x0001 | 0x0001 | pip_metadata | Movie PlayList file |
| 0x0001 | 0x0002 | HDMV_LPCM_down_mix_coefficient | Clip Information file |
| 0x0002 | 0x0001 | STN_table_SS | Movie PlayList file |
| 0x0002 | 0x0002 | SubPath_entries_extension | Movie PlayList file |
| 0x0002 | 0x0003 | active_video_window | Movie PlayList file |
| 0x0002 | 0x0004 | Extent_Start_Point | Clip Information file |
| 0x0002 | 0x0005 | ProgramInfo_SS | Clip Information file |
| 0x0002 | 0x0006 | CPI_SS | Clip Information file |
| 0xaaaa | 0xbbbb | UHD_Ext | Index Table |

FIG. 14

| Syntax | No. of bits | Mnemonic |
|---|---|---|
| UHD_Ext() { | | |
|   length | 32 | uimsbf |
|   ... | ... | ... |
|   mastering_monitor_info | 4 | bslbf |
|   ... | ... | ... |
|   reserved_for_future_use | ... | bslbf |
|   ... | ... | ... |
| } | | |

FIG. 15

| Syntax | No. of bits | Mnemonic |
|---|---|---|
| UHD_Ext() { | | |
|   length | 32 | uimsbf |
|   ... | ... | ... |
|   mastering_monitor_color_primaries | 4 | bslbf |
|   mastering_monitor_luminance | 4 | bslbf |
|   reserved_for_future_use | ... | bslbf |
|   ... | ... | ... |
| } | | |

FIG. 16

| Syntax | No. of bits | Mnemonic |
|---|---|---|
| UHD_Ext() { | | |
| length | 32 | uimsbf |
| ... | ... | ... |
| for ( c = 0; c<3; c++) { | | |
| display_primaries_x [ c ] | 16 | bslbf |
| display_primaries_y [ c ] | 16 | bslbf |
| } | | |
| white_point_x | 16 | bslbf |
| white_point_y | 16 | bslbf |
| max_display_mastering_luminance | 32 | bslbf |
| min_display_mastering_luminance | 32 | bslbf |
| ... | | |
| reserved_for_future_use | ... | bslbf |
| ... | ... | |
| } | | |

FIG. 17

| Syntax | No. of bits | Mnemonic |
|---|---|---|
| xxxxx.mpls{ | | |
|     type_indicator | 8*4 | bslbf |
|     version_number | 8*4 | bslbf |
|     PlayList_start_address | 32 | uimsbf |
|     PlayListMark_start_address | 32 | uimsbf |
|     ExtensionData_start_address | 32 | uimsbf |
|     reserved_for_future_use | 160 | bslbf |
|     AppInfoPlayList() | | |
|     for(i=0; i<N1; i++){ | | |
|         padding_word | 16 | bslbf |
|     } | | |
|     PlayList() | | |
|     for(i=0; i<N2; i++){ | | |
|         padding_word | 16 | bslbf |
|     } | | |
|     PlayListMark() | | |
|     for(i=0; i<N3; i++){ | | |
|         padding_word | 16 | bslbf |
|     } | | |
|     ExtensionData() | | |
|     for(i=0; i<N4; i++){ | | |
|         padding_word | 16 | bslbf |
|     } | | |
| } | | |

FIG. 18

| Syntax | No. of bits | Mnemonic |
|---|---|---|
| AppInfoPlayList() { | | |
|   length | 32 | uimsbf |
|   reserved_for_future_use | 8 | bslbf |
|   PlayList_playback_type | 8 | bslbf |
|   if (PlayList_playback_type==2 \|\| PlayList_playback_type==3) { | | |
|     playback_count | 16 | uimsbf |
|   } else { | | |
|     reserved_for_future_use | 16 | bslbf |
|   } | | |
|   UO_mask_table() | | |
|   PlayList_random_access_flag | 1 | bslbf |
|   audio_mix_app_flag | 1 | bslbf |
|   lossless_may_bypass_mixer_flag | 1 | bslbf |
|   MVC_Base_view_R_flag | 4 | bslbf |
|   mastering_monitor_color_primaries | 4 | bslbf |
|   mastering_monitor_luminance | 4 | bslbf |
|   reserved_for_future_use | | |
| } | | |

FIG. 19

| Syntax | No. of bits | Mnemonic |
|---|---|---|
| zzzzz.clpi { | | |
|     type_indicator | 8*4 | bslbf |
|     version_number | 8*4 | bslbf |
|     SequenceInfo_start_address | 32 | uimsbf |
|     ProgramInfo_start_address | 32 | uimsbf |
|     CPI_start_address | 32 | uimsbf |
|     ClipMark_start_address | 32 | uimsbf |
|     ExtensionData_start_address | 32 | uimsbf |
|     reserved_for_future_use | 96 | bslbf |
|     ClipInfo() | | |
|     for (i=0; i<N1; i++) { | | |
|         padding_word | 16 | bslbf |
|     } | | |
|     SequenceInfo() | | |
|     for (i=0; i<N2; i++) { | | |
|         padding_word | 16 | bslbf |
|     } | | |
|     ProgramInfo() | | |
|     for (i=0; i<N3; i++) { | | |
|         padding_word | 16 | bslbf |
|     } | | |
|     CPI() | | |
|     for (i=0; i<N4; i++) { | | |
|         padding_word | 16 | bslbf |
|     } | | |
|     ClipMark() | | |
|     for (i=0; i<N5; i++) { | | |
|         padding_word | 16 | bslbf |
|     } | | |
|     ExtensionData() | | |
|     for (i=0; i<N6; i++) { | | |
|         padding_word | 16 | bslbf |
|     } | | |
| } | | |

FIG. 20

| Syntax | No. of bits | Mnemonic |
|---|---|---|
| ClipInfo() { | | |
|   length | 32 | uimsbf |
|   reserved_for_future_use | 16 | bslbf |
|   Clip_stream_type | 8 | bslbf |
|   application_type | 8 | bslbf |
|   mastering_monitor_color_primaries | 4 | bslbf |
|   mastering_monitor_luminance | 4 | bslbf |
|   reserved_for_future_use | 23 | bslbf |
|   is_ATC_delta | 1 | bslbf |
|   TS_recording_rate | 32 | uimsbf |
|   number_of_source_packets | 32 | uimsbf |
|   reserved_for_future_use | 1024 | bslbf |
|   TS_type_info_block() | | |
|   if (is_ATC_delta==1b) { | | |
|     reserved_for_future_use | 8 | bslbf |
|     number_of_ATC_delta_entries | 8 | uimsbf |
|     for (i=0; i<number_of_ATC_delta_entries; i++) { | | |
|       ATC_delta[i] | 32 | uimsbf |
|       following_Clip_Information_file_name[i] | 8*5 | bslbf |
|       Clip_codec_identifier | 8*4 | bslbf |
|       reserved_for_future_use | 8 | bslbf |
|     } | | |
|   } | | |
|   if (application_type==6) { | | |
|     reserved_for_future_use | 8 | bslbf |
|     number_of_font_files | 8 | uimsbf |
|     for (font_id=0; font_id<number_of_font_files; font_id++) { | | |
|       font_file_name[font_id] | 8*5 | bslbf |
|       reserved_for_future_use | 8 | bslbf |
|     } | | |
|   } | | |
| } | | |

FIG. 21

| application_type | meaning |
|---|---|
| 0 | reserved |
| 1 | Main TS for a main-path of Movie |
| 2 | Main TS for a main-path of Time based slide show |
| 3 | Main TS for a main-path of Browsable slide show |
| 4 | Sub TS for a sub-path of Browsable slide show |
| 5 | Sub TS for a sub-path of Interactive Graphics menu |
| 6 | Sub TS for a sub-path of Text subtitle |
| 7 | Sub TS for a sub-path of one or more elementary streams path or Sub TS for a sub-path of MPEG-4 MVC Dependent view video stream path. This Sub TS containing MPEG-4 MVC Dependent view video and/or an associated Main TS are provided from the Binding Unit Data Area |
| 8 | Sub TS for a sub-path of MPEG-4 MVC Dependent view video stream path on the BD-ROM disc This Sub TS containing MPEG-4 MVC Dependent view video and an associated Main TS compose a Stereoscopic Interleaved file stored on the BD-ROM disc |
| 9 | Sub TS for a sub-path of Stereoscopic Interactive Graphics presentation menu |
| 10 | Main TS for a main-path of HDR/WCG Movie |
| 11 – 255 | reserved |

FIG. 22

| Syntax | No. of bits | Mnemonic |
|---|---|---|
| ClipInfo() { | | |
|   length | 32 | uimsbf |
|   reserved_for_future_use | 16 | bslbf |
|   Clip_stream_type | 8 | bslbf |
|   application_type | 8 | bslbf |
|   reserved_for_future_use | 31 | bslbf |
|   ... | 32 | uimsbf |
|   if (application_type==10) { | | |
|     reserved_for_future_use | ... | bslbf |
|     mastering_monitor_color_primaries | 4 | bslbf |
|     mastering_monitor_luminance | 4 | bslbf |
|   } | | |
| } | | |

FIG. 23

| Syntax | No. of bits | Mnemonic |
|---|---|---|
| ProgramInfo() { | | |
|   length | 32 | uimsbf |
|   reserved_for_word_align | 8 | bslbf |
|   number_of_program_sequences | 8 | uimsbf |
|   for(i=0; i<number_of_program_sequences; i++) { | | |
|     SPN_program_sequence_start[i] | 32 | uimsbf |
|     program_map_PID[i] | 16 | uimsbf |
|     number_of_streams_in_ps[i] | 8 | uimsbf |
|     reserved_for_future_use | 8 | bslbf |
|     for(stream_index=0; stream_index<number_of_streams_in_ps[i]; stream_index++) { | | |
|       stream_PID[i][stream_index] | 16 | uimsbf |
|       StreamCodingInfo(i, stream_index) | | |
|     } | | |
|   } | | |
| } | | |

FIG. 24

| Syntax | No. of bits | Mnemonic |
|---|---|---|
| StreamCodingInfo(i, stream_index) { | | |
|   length | 8 | uimsbf |
|   stream_coding_type | 8 | bslbf |
|   if (stream_coding_type==0x02 \|\| | | |
|     stream_coding_type==0x1B \|\| | | |
|     stream_coding_type==0xEA) { | | |
|     video_format | 4 | bslbf |
|     frame_rate | 4 | bslbf |
|     aspect_ratio | 4 | bslbf |
|     reserved_for_future_use | 2 | bslbf |
|     cc_flag | 1 | bslbf |
|     reserved_for_future_use | 17 | bslbf |
|     ISRC() | | |
|     ... | | |
|   else if (stream_coding_type==0xMM \|\| | | |
|     stream_coding_type==0xMM) { | | |
|     video_format | 4 | bslbf |
|     frame_rate | 4 | bslbf |
|     aspect_ratio | 4 | bslbf |
|     reserved_for_future_use | 2 | bslbf |
|     cc_flag | 1 | bslbf |
|     reserved_for_future_use | 17 | bslbf |
|     ISRC() | | |
|     mastering_monitor_color_primaries | 4 | bslbf |
|     mastering_monitor_luminance | 4 | bslbf |
|     reserved_for_future_use | 24 | bslbf |
|     ... | | ... |
| } | | |

FIG. 25

| stream_coding_type | Meaning |
|---|---|
| 0x02 | MPEG-2 video stream for Primary / Secondary video |
| 0x1B | MPEG-4 AVC video stream for Primary / Secondary video |
| 0xNN | HEVC video stream for Primary video |
| 0xMM | HEVC video stream for HDR Primary video |
| 0xEA | SMPTE VC-1 video stream for Primary / Secondary video |
| 0x80 | HDMV LPCM audio stream for Primary audio |
| 0x81 | Dolby Digital (AC-3) audio stream for Primary audio |
| 0x82 | DTS audio stream for Primary audio |
| 0x83 | Dolby Lossless audio stream for Primary audio |
| 0x84 | Dolby Digital Plus audio stream for Primary audio |
| 0x85 | DTS-HD audio stream except XLL for Primary audio |
| 0x86 | DTS-HD audio stream XLL for Primary audio |
| 0x87 | DRA audio stream for Primary audio |
| 0x88 | DRA Extension audio stream for Primary audio |
| 0xA1 | Dolby Digital Plus audio stream for Secondary audio |
| 0xA2 | DTS-HD audio stream for Secondary audio stream |
| 0x90 | Presentation Graphics stream |
| 0x91 | Interactive Graphics stream |
| 0x92 | Text subtitle stream |
| Other values | reserved |

FIG. 26

| video_format | Meaning | Video standard |
|---|---|---|
| 0 | reserved | |
| 1 | 480i | ITU-R BT.601-5 |
| 2 | 576i | ITU-R BT.601-5 |
| 3 | 480p | SMPTE 293M |
| 4 | 1080i | SMPTE 274M |
| 5 | 720p | SMPTE 296M |
| 6 | 1080p | SMPTE 274M |
| 7 | 576p | ITU-R BT.1358 |
| 8 | 2160p | ITU-R BT.2020 |
| 9 – 14 | reserved | |
| 15 | reserved | |

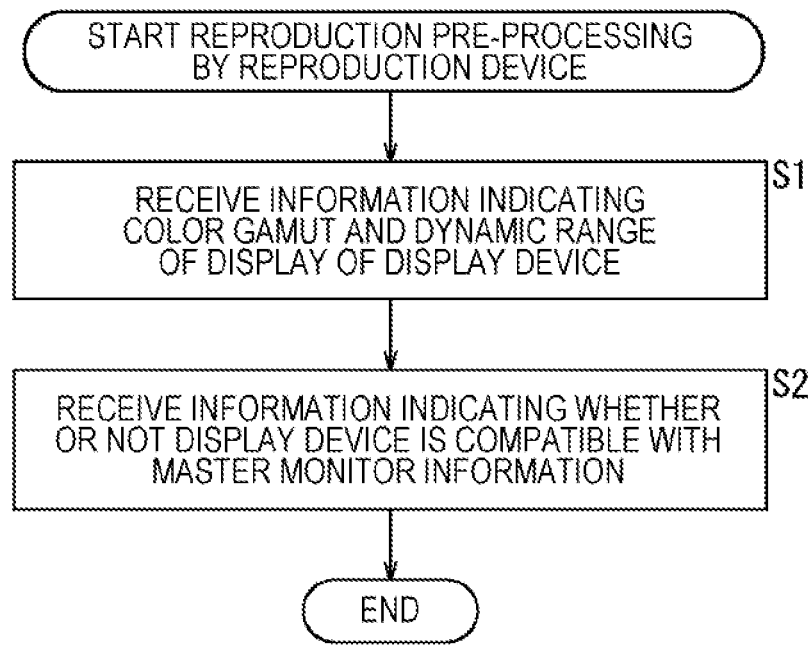
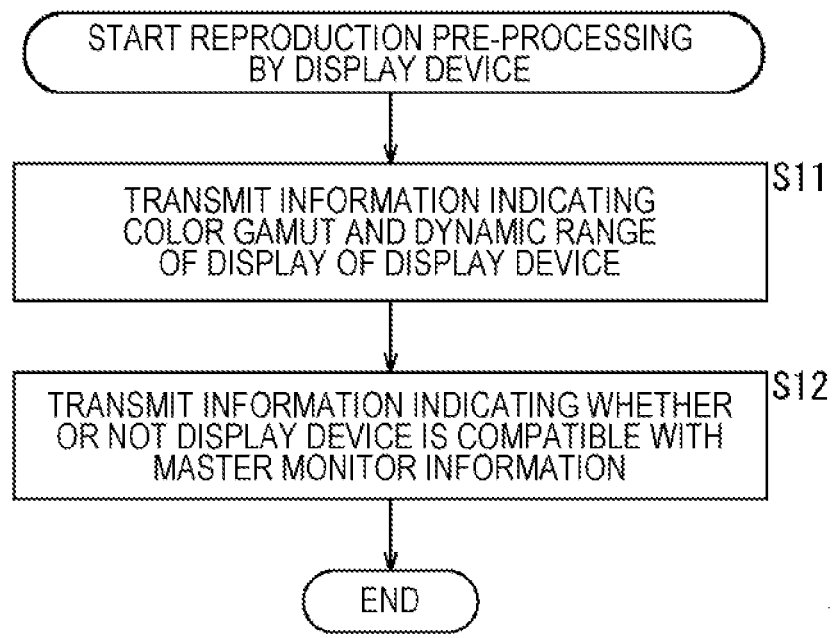

FIG. 38

| AU DELIMITER | VPS | SPS | PPS | SEI | VCL | EOS | EOS |

FIG. 39

| | Descriptor |
|---|---|
| mastering_display_color_volume( payloadSize ) { | |
| for( c = 0; c < 3; c++) { | |
|   display_primaries_x [ c ] | u(16) |
|   display_primaries_y [ c ] | u(16) |
| } | |
| white_point_x | u(16) |
| white_point_y | u(16) |
| max_display_mastering_luminance | u(32) |
| min_display_mastering_luminance | u(32) |
| } | |

FIG. 40

| Syntax | No. of bits | Mnemonic |
|---|---|---|
| ClipInfo() { | | |
|   length | 32 | uimsbf |
|   reserved_for_future_use | 16 | bslbf |
|   Clip_stream_type | 8 | bslbf |
|   application_type | 8 | bslbf |
|   mastering_monitor_color_primaries | 4 | bslbf |
|   mastering_monitor_luminance | 4 | bslbf |
|   mastering_monitor_sei_present_flag | 1 | bslbf |
|   reserved_for_future_use | 22 | bslbf |

REPRODUCTION DEVICE, REPRODUCTION METHOD, AND PROGRAM

CROSS-REFERENCE TO RELATED APPLICATIONS

The present application is a continuation application of U.S. patent application Ser. No. 15/562,068, filed on Sep. 27, 2017, which is a national phase entry under 35 U.S.C. § 371 of International Application No. PCT/JP2015/061581, filed on Apr. 15, 2015, the disclosures of which are hereby incorporated herein by reference.

TECHNICAL FIELD

The present technology relates to a reproduction device, a reproduction method, and a program, and more particularly, to a reproduction device, a reproduction method, and a program which are capable of transferring information about a color gamut and a dynamic range of luminance of a content recorded in a recording medium to a display device.

BACKGROUND ART

Recording media for recording a content such as a movie include Blu-ray (registered trademark) Disc (hereinafter referred to as "BD", as needed).

In recent years, a technique capable of recording a content of so-called ultra high definition (UHD), such as 4K (3840×2160 pixels) and 8K (7680×4320 pixels), which exceed high definition (HD), in a BD has been studied.

CITATION LIST

Patent Document

Patent Document 1: Japanese Patent Application Laid-Open No. 2009-58692
Patent Document 2: Japanese Patent Application Laid-Open No. 2009-89209

SUMMARY OF THE INVENTION

Problems to be Solved by the Invention

There is a possibility that wide color gamut specifications, such as BT.2020, may be employed as color gamut specifications for a UHD content to be recorded in a BD. BT.2020 is a color gamut specification wider than BT.709 which is a color gamut specification employed in the current HD content.

Further, there is a possibility that a high dynamic range (HDR) content, which is a content obtained by extending a dynamic range of luminance to be larger than a standard dynamic range may be recorded in a BD.

It is necessary to transfer information about the color gamut and dynamic range of a content recorded in the BD to a display from a BD player so that the content can be output with a color and brightness as intended by an author.

The present technology has been made in view of the above-mentioned circumstances and makes it possible to transfer information about a color gamut and a dynamic range of luminance of a content recorded in a recording medium to a display device.

Solutions to Problems

A reproduction device of one aspect of the present technology includes: a readout unit configured to read out, from a recording medium recording a content, a file of a video stream and a file of reproduction management information used for reproducing the video stream and including monitor information indicating at least one of a color gamut and a dynamic range of luminance of a master monitor used for authoring the video stream; a decoding unit configured to decode the video stream; and an output unit configured to control an output of video data obtained by decoding the video stream and the monitor information included in the reproduction management information to a display device, depending on a performance of the display device to which the content is output.

In a case where the display device is a device that is compatible with processing for the monitor information output from the reproduction device, the output unit can output the monitor information, as well as the video data, to the display device.

In a case where the display device is a device that is not compatible with processing for the monitor information output from the reproduction device, the output unit can cause the display device to output the video data to the display device, or can cause the display device to output the processed video data obtained by performing predetermined processing on the video data.

It is possible to further provide a color gamut conversion unit that converts video data obtained by decoding the video stream into video data having a reduced color gamut in a case where the color gamut represented by the monitor information is wider than the color gamut of a display unit included in the display device. In this case, the output unit can cause the display device to output the processed video data on which processing is performed by the color gamut conversion unit as the predetermined processing.

It is possible to further provide a dynamic range conversion unit that converts video data obtained by decoding the video stream into video data having a reduced dynamic range in a case where the dynamic range of the luminance represented by the monitor information is wider than the dynamic range of the luminance of the display unit included in the display device. In this case, the output unit can output, to the display device, the processed video data on which processing is performed by the dynamic range conversion unit as the predetermined processing.

The reproduction management information includes a flag indicating whether or not the monitor information is included in the video stream. It is possible to further provide an acquisition unit that acquires the monitor information from the video stream in a case where the flag indicates that the monitor information is included in the video stream, and a control unit that performs processing on the basis of the monitor information acquired by the acquisition unit, of the monitor information acquired by the acquisition unit and the monitor information included in the reproduction management information.

The recording medium may be a BD-ROM, and the monitor information may be included in any one of Index table, PlayList, and Clip Information, the Index table, the PlayList, and the Clip Information being the reproduction management information.

A reproduction method of one aspect of the present technology includes the steps of: reading out, by a drive, from a recording medium recording a content, a file of a video stream and a file of reproduction management information used for reproducing the video stream and including monitor information indicating at least one of a color gamut and a dynamic range of luminance of a master monitor used for authoring the video stream; decoding the video stream by a decoder; and controlling an output of video data obtained by decoding the video stream and the monitor information included in the reproduction management information to a display device, depending on a performance of the display device to which the content is output.

In one aspect of the present technology, a file of a video stream and a file of reproduction management information used for reproducing the video stream and including monitor information indicating at least one of a color gamut and a dynamic range of luminance of a master monitor used for authoring the video stream are read out from the recording medium recording the content, and the video stream is decoded. Further, video data obtained by decoding the video stream and an output of the monitor information included in the reproduction management information to the display device are controlled depending on the performance of the display device to which the content is output.

Effects of the Invention

According to the present technology, it is possible to transfer, to a display device, information about a color gamut and a dynamic range of luminance of a content recorded in a recording medium.

Note that the advantageous effects described herein are not particularly limited, and any of the advantageous effects described in this disclosure may be obtained.

BRIEF DESCRIPTION OF DRAWINGS

FIG. 5 is a diagram illustrating syntax in an Index table.

FIG. 6 is a diagram illustrating a syntax of AppInfoBDMV( ) illustrated in FIG. 5.

FIG. 7 is a diagram illustrating an example of mastering_monitor_info.

FIG. 8 is a diagram illustrating a syntax of Indexes( ) illustrated in FIG. 5.

FIG. 9 is a diagram illustrating another syntax of Indexes ( )

FIG. 10 is a diagram illustrating an example of mastering_monitor_color_primaries.

FIG. 11 is a diagram illustrating mastering_monitor_luminance.

FIG. 12 is a diagram illustrating a syntax of ExtensionData( ).

FIG. 13 is a diagram illustrating a meaning of a combination of values ID1 and ID2.

FIG. 14 is a diagram illustrating a first example of UHD_Ext( ).

FIG. 15 is a diagram illustrating a second example of UHD_Ext( );

FIG. 16 is a diagram illustrating a third example of UHD_Ext( ).

FIG. 17 is a diagram illustrating a syntax of PlayList.

FIG. 18 is a diagram illustrating a syntax of AppInfoPlayList( ) illustrated in FIG. 17.

FIG. 19 is a diagram illustrating a syntax of Clip Information.

FIG. 20 is a diagram illustrating a syntax of ClipInfo( ) illustrated in FIG. 19.

FIG. 21 is a diagram illustrating an example of application_type.

FIG. 22 is a diagram illustrating an example of ClipInfo ( ) including application_type=10.

FIG. 23 is a diagram illustrating a syntax of ProgramInfo ( ) illustrated in FIG. 19.

FIG. 24 is a diagram illustrating a syntax of StreamCodingInfo illustrated in FIG. 23.

FIG. 25 is a diagram illustrating an example of stream_coding_type.

FIG. 26 is a diagram illustrating an example of video_format.

FIG. 33 is a flowchart illustrating pre-reproduction processing performed by the reproduction device.

FIG. 34 is a flowchart illustrating pre-reproduction processing performed by the display device.

FIG. 38 is a diagram illustrating a configuration of an access unit of HEVC.

FIG. 39 is a diagram illustrating a syntax of HEVC Mastering monitor information SEI.

FIG. 40 is a diagram illustrating a part of ClipInfo( ) of Clip Information.

MODE FOR CARRYING OUT THE INVENTION

Modes for carrying out the present technology will be described below. The description is made in the following order.

First embodiment
1. Regarding a reproduction system
2. Regarding a BD format
2-1. First description example of master monitor information
2-2. Second description example of master monitor information 2-3. Third description example of master monitor information 2-4. Fourth description example of master monitor information 2-5. Fifth description example of master monitor information 2-6. Sixth description example of master monitor information 2-7. Seventh description example of master monitor information 2-8. Eighth description example of master monitor information 3. Regarding the configuration of each device
4. Regarding the operation of each device
Second embodiment
Regarding a Recording Device First Embodiment 1. Regarding a Reproduction System FIG. 1 is a diagram illustrating a configuration example of a reproduction system according to one embodiment of the present technology.

Figure 1:
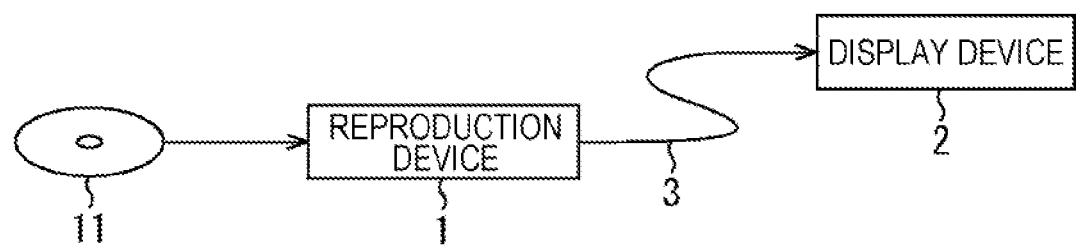
FIG. 1 is a diagram illustrating a configuration example of a reproduction system according to one embodiment of the present technology.

The reproduction system illustrated in FIG. 1 includes a reproduction device 1 and a display device 2. The reproduction device 1 and the display device 2 are connected via a cable 3 which is a cable for high definition multimedia interface (HDMI (registered trademark)) specifications. The reproduction device 1 and the display device 2 may be connected via a cable for other specifications, or may be connected via radio communication.

The reproduction device 1 reproduces a content recorded in an optical disc 11. The optical disc 11 is a disc recording a content in, for example, a Blu-ray (registered trademark) disc read-only (BD-ROM) format.

The content recorded in the optical disc 11 is a content including video data of so-called UHD, such as 4K and 8K. 4K has a vertical and horizontal resolution of, for example, 3840×2160 pixels. 8K has a vertical and horizontal resolution of, for example, 7680×4320 pixels. For example, high efficiency video coding (HEVC) is used for encoding UHD video data.

Further, the UHD video data recorded in the optical disc 11 is, for example, video data having a wide color gamut, such as BT.2020, and an HDR. The term "HDR" described herein refers to a luminance dynamic range wider than a standard dynamic range of 0 to 100 $cd/m^2$ (=100 nit).

The optical disc 11 records information indicating the color gamut and dynamic range of the master monitor used for authoring the video data recorded in the optical disc 11. In other words, information indicating the color gamut and dynamic range of the master monitor also represents the color gamut and dynamic range of the video data itself recorded in the optical disc 11.

The information indicating the color gamut and dynamic range of the master monitor is hereinafter referred to as master monitor information, as needed. The master monitor information may be one type of information indicating both a color gamut and a dynamic range, or may be composed of a plurality of pieces of information each indicating a color gamut and a dynamic range.

The reproduction device 1 performs communication with the display device 2 via the cable 3, and acquires information about the performance of the display device 2. The information about the performance of the display device 2 includes information indicating the color gamut and dynamic range of a display included in the display device 2, and information indicating whether or not the display device 2 is a device that can understand the master monitor information output from the reproduction device 1. Reproduction processing performed by the reproduction device 1 is switched depending on the performance of the display device 2.

The reproduction device 1 drives a drive, reads out the master monitor information from the optical disc 11, and reads out a video stream from the optical disc 11 and decodes the video stream.

In a case where the display device 2 is a device that can understand the master monitor information, the reproduction device 1 outputs the master monitor information, as well as the video data obtained through decoding, to the display device 2.

Further, in a case where the display device 2 is a device that cannot understand the master monitor information, the reproduction device 1 outputs the video data obtained through decoding to the display device 2. The reproduction device 1 performs, as needed, conversion processing for reducing the color gamut or dynamic range on the video data output from the display device 2.

For example, in a case where the color gamut of the content recorded in the optical disc 11 is BT.2020, while the color gamut of the display included in the display device 2 is BT.709, the conversion processing for reducing the color gamut is performed by the reproduction device 1.

The display device 2 receives the video data transmitted from the reproduction device 1, and displays the video of the content on the display. The reproduction device 1 also transmits audio data of the content. The display device 2 causes a speaker to output the audio of the content on the basis of the audio data transmitted from the reproduction device 1.

For example, in a case where the master monitor information is transmitted together with the video data, the display device 2 specifies the color gamut and dynamic range of the content recorded in the optical disc 11 on the basis of the master monitor information. In a case where the display included in the display device 2 is not compatible with the display of the content recorded in the optical disc 11, the display device 2 refers to the master monitor information and performs the conversion processing for reducing the color gamut and dynamic range on the video data transmitted from the reproduction device 1. The display device 2 causes the display to display the video of the content on the basis of the video data obtained after the conversion of the color gamut and dynamic range.

In this manner, the optical disc 11 in which the UHD video data is recorded also includes the master monitor information which is information indicating the actual color gamut and dynamic range of the video data. The reproduction device 1 outputs the master monitor information as well as the video data, thereby making it possible to transmit the actual color gamut and dynamic range of the video data to the display device 2.

The display device 2 performs the conversion processing on the video data depending on the performance of the display included in the display device 2 after the actual color gamut and dynamic range are specified, thereby enabling display of the video with a color and brightness as intended by an author.

If the video data transferred via the cable 3 is UHD video data, assume that the display device 2 recognizes the color gamut of the video data to be BT.2020. In this case, in a case where the color gamut of the display and the actual color gamut of the video data are narrower than BT.2020, the display device 2 performs processing for converting the video data into video data having a color gamut narrower than the actual color gamut. However, such processing can be prevented from being performed.

For example, in a case where the color gamut of the master monitor used for authoring is BT.709; on drawing the color gamut in the transfer format of the content recorded in the optical disc 11 is BT.2020; and the color gamut of the display is BT.709, the reproduction device 1 directly outputs the content recorded in the optical disc 11 to the display device 2, without performing a color gamut compression. It is possible to prevent an unnecessary color gamut compression from being performed in the reproduction device 1 in a case where the color gamut in the transfer format is wider than the color gamut of the display.

2. Regarding a BD Format

Figure 2:
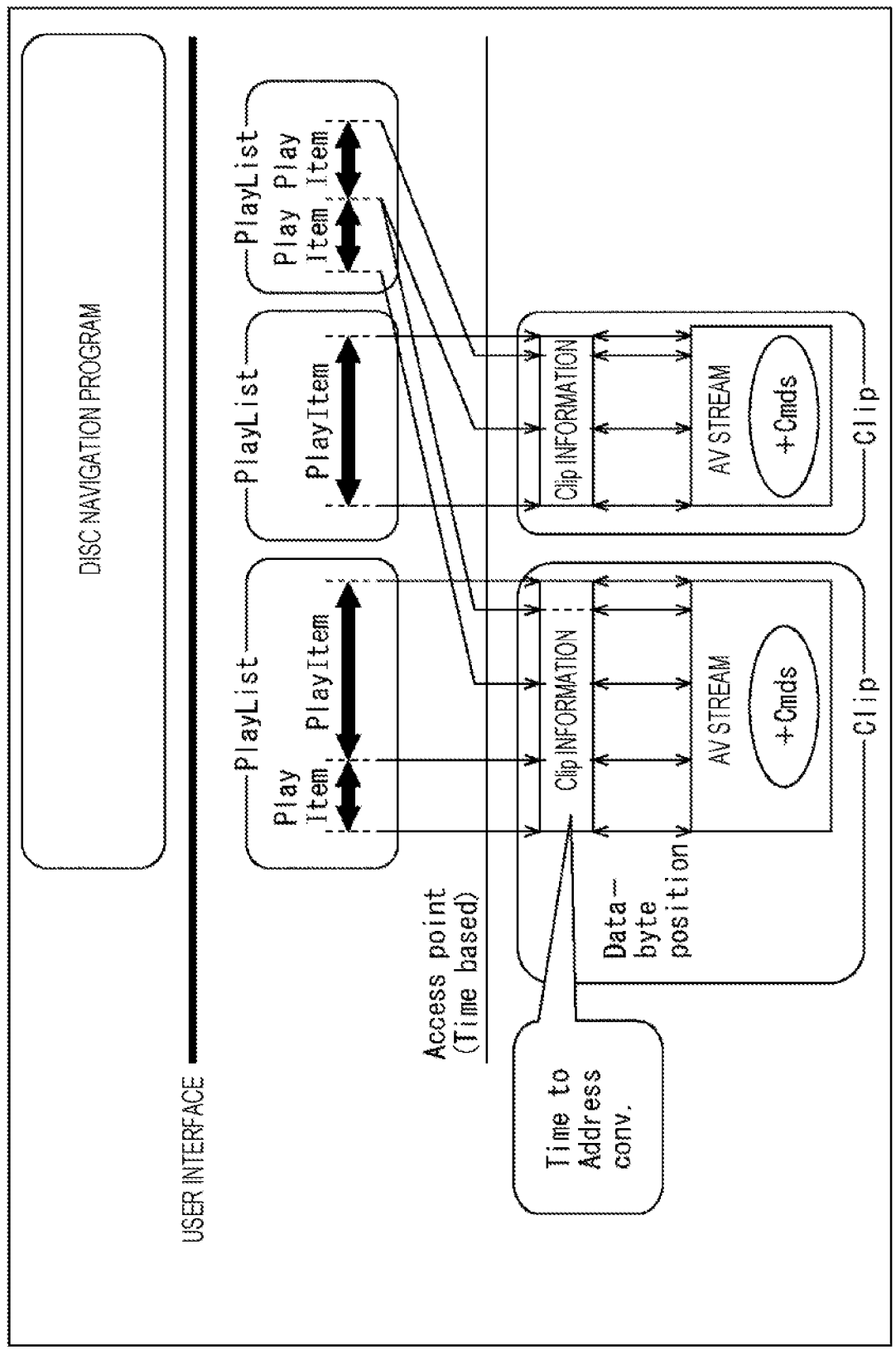
FIG. 2 is a diagram illustrating an example of a management structure of an AV stream in a BD-ROM format.

A BD-ROM format will now be described.
[Data Management Structure]
FIG. 2 is a diagram illustrating an example of a management structure of an AV stream in a BD-ROM format.

The management of the AV stream including an HEVC video stream is performed using two layers of PlayList and Clip. The AV stream may be recorded not only in the optical disc 11, but also in a local storage of the reproduction device 1.

A pair of one AV stream and Clip Information, which is information associated with the AV stream, is managed as one object. A pair of an AV stream and Clip Information is referred to as Clip.

The AV stream is developed on a time axis, and an access point of each Clip is designated mainly by a time stamp in PlayList. Clip Information is used for, for example, finding an address from which decoding in the AV stream is to be started.

PlayList is a set of reproduction sections of the AV stream. One reproduction section in the AV stream is referred to as PlayItem. PlayItem is represented by a pair of an IN point and an OUT point of the reproduction section on the time axis. As illustrated in FIG. 2, PlayList is composed of one or more PlayItems.

A first PlayList counting from the left in FIG. 2 is composed of two PlayItems. The two PlayItems refer to the first half and the latter half of the AV stream included in the left-side Clip.

A second PlayList counting from the left is composed of one PlayItem. The PlayItem refers to the entire AV stream included in the right-side Clip.

A third PlayList counting from the left is composed to two PlayItems. The two PlayItems refer to a certain part in the AV stream included in the left-side Clip and a certain part in the AV stream included in the right-side Clip.

For example, in a case where the left-side PlayItem included in the first PlayList counting from the left is designated as a reproduction target by a disc navigation program, the first half of the AV stream that is referred to by the PlayItem and is included in the left-side Clip is reproduced.

In the PlayList, a reproduction path formed by a sequence of one or more PlayItems is referred to as Main Path. Further, a reproduction path formed by a sequence of one or more SubPlayItems in parallel with the Main Path in the PlayList is referred to as Sub Path.

Figure 3:
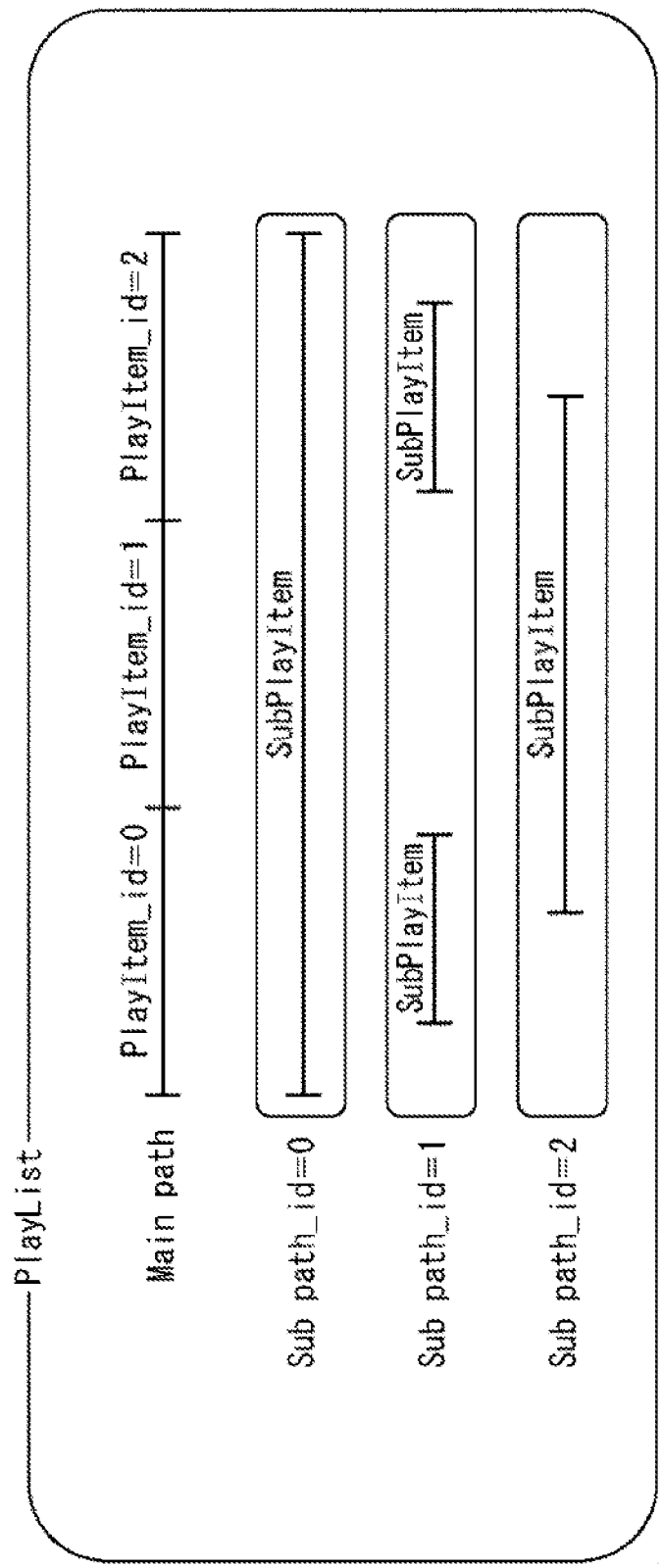
FIG. 3 is a diagram illustrating structures of Main Path and Sub Path.

FIG. 3 is a diagram illustrating structures of Main Path and Sub Path.

PlayList has one Main Path and one or more Sub Paths. PlayList illustrated in FIG. 3 has one Main Path and three Sub Paths which are created by a sequence of three PlayItems.

IDs are sequentially set to the PlayItems, which constitute the Main Path, from the head. IDs of Subpath_id=0, Subpath_id=1, and Subpath_id=2 are sequentially set to the Sub Paths from the head.

In the example of FIG. 3, the Sub Path having Subpath_id=0 includes one SubPlayItem, and the Sub Path having Subpath_id=1 includes two SubPlayItems. Further, the Sub Path having Subpath_id=2 includes one SubPlayItem.

The AV stream referred to by one PlayItem includes at least a video stream (main image data). The AV stream may include one or more audio streams reproduced at the same timing as (in synchronization with) the video stream included in the AV stream, or may include no audio stream.

The AV stream may include one or more subtitle data (PG (Presentation Graphic)) streams of a bitmap reproduced in synchronization with the video stream included in the AV stream, or may include no subtitle data stream.

The AV stream may include one or more interactive graphic (IG) streams reproduced in synchronization with the video stream included in the file of the AV stream, or may include no IG stream. The IG stream is used for displaying graphics such as buttons to be operated by a user.

The AV stream referred to by one PlayItem is multiplexed with a video stream, an audio stream reproduced in synchronization with the video stream, a PG stream, and an IG stream.

Further, one SubPlyItem refers to a video stream, an audio stream, a PG stream, and the like of a stream different from the AV stream referred to by the PlayItem.

In this manner, the reproduction of the AV stream including the HEVC video stream is performed using PlayList and Clip Information. The information, such as PlayList or Clip Information, which is information about a file different from the file of the AV stream and is used for managing the reproduction of the AV stream, is referred to as Data Base information, as needed.

Figure 4:
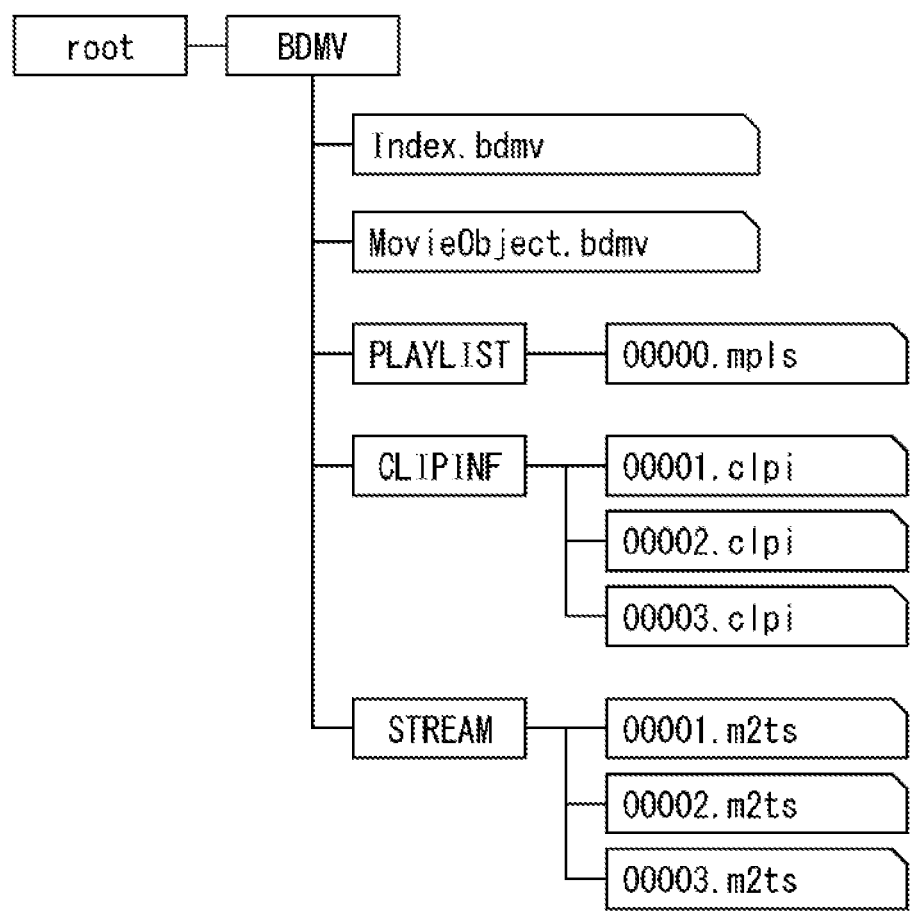
FIG. 4 is a diagram illustrating an example of a management structure of a file.

[Directory Structure]
FIG. 4 is a diagram illustrating an example of a management structure of a file recorded in the optical disc 11.

Each file recorded in the optical disc 11 is hierarchically managed by a directory structure. One root directory is created on the optical disc 11.

A BDMV directory is placed under the root directory.

One Index table file, which is a file to which a name "Index.bdmv" is set, is stored under the BDMV directory. The above-mentioned Data Base information also includes an Index table. A MovieObject file, which is a file to which a name "MovieObject.bdmv" is set, is stored under the BDMV directory.

Under the BDMV directory, a PLAYLIST directory, a CLIPINF directory, a STREAM directory, and the like are provided.

The PLAYLIST directory stores a PlayList file in which PlayList is described. A name which is a combination of a number of five figures and an extension ".mpls" is set to each PlayList file. A file name "00000.mpls" is set to one PlayList file illustrated in FIG. 4. A plurality of PlayList files may be included in the PLAYLIST directory.

The CLIPINF directory stores a Clip Information file. A name which is a combination of a number of five figures and an extension ".clpi" is set to each Clip Information file. File names "00001.clpi", "00002.clpi", and "00003.clpi" are respectively set to three Clip Information files illustrated in FIG. 4.

The STREAM directory stores stream files. A name which is a combination of a number of five figures and an extension ".m2ts" is set to each stream file. File names "00001.m2ts", "00002.m2ts", and "00003.m2ts" are respectively set to three stream files illustrated in FIG. 4.

The Clip Information file and the stream file, for each of which the same number of five figures is set to a file name, are files that constitute one Clip. A Clip Information file "00001.clpi" is used during the reproduction of a stream file "00001.m2ts", and a Clip Information file "00002.clpi" is used during the reproduction of a stream file "00002.m2ts".

[Syntax of Each File]

A main description of a syntax of each file will be described. The master monitor information can be described at various positions in the Data Base information.

2-1. First Description Example of Master Monitor Information

An example of describing the master monitor information in the Index table will be described.

FIG. 5 is a diagram illustrating a syntax in the Index table.

AppInfoBDMV( ) Indexes( ) and ExtensionData( ) are described in the Index table (Index.bdmv). AppInfoBDMV ( ) represents information including an important parameter related to the reproduction of the optical disc 11. Indexes( ) represents information for specifying a content of an operation according to a use's operation and information for specifying a content of a first operation when the optical disc 11 is loaded. ExtensionData( ) represents information including various pieces of information for extending the Index table.

FIG. 6 is a diagram illustrating a syntax of AppInfoBDMV( ) illustrated in FIG. 5.

AppInfoBDMV( ) includes 1-bit initial_output_mode_preference and 1-bit SS_content_exist_flag.

The initial_output_mode_preference indicates whether the output mode is a 2D Output Mode or Stereoscopic Output Mode (3D mode). The SS_content_exist_flag indicates a function that can be implemented using the optical disc 11.

Further, AppInfoBDMV( ) includes 4-bit mastering_monitor_info, 4-bit video_format and 4-bit frame_rate with a 1-bit reserve area interposed therebetween.

This differs from the syntax of AppInfoBDMV( ) in "Blu-ray Disc Read-Only Format Part3 version2.4" in that the number of bits of a reserve area is reduced and mastering_monitor_info is added. Mastering_monitor_info is the above-mentioned master monitor information.

FIG. 7 is a diagram illustrating an example of mastering_monitor_info.

Mastering_monitor_info=1 indicates that each of a color gamut, a maximum luminance, and a minimum luminance is unknown.

Mastering_monitor_info=2 indicates that the color gamut is BT.709 (ITU-R BT.709) and the maximum luminance and the minimum luminance are unknown.

Mastering_monitor_info=3 indicates that the color gamut is DCI (Digital Cinema Initiatives) P3 and the maximum luminance and the minimum luminance are unknown.

Mastering_monitor_info=4 indicates that the color gamut is BT.2020 (ITU-R BT.2020) and the maximum luminance and the minimum luminance are unknown.

Mastering_monitor_info=5 indicates that the color gamut is BT.709, the maximum luminance is 1000 cd/m$^2$, and the minimum luminance is 0 cd/m$^2$.

Mastering_monitor_info=6 indicates that the color gamut is DCI P3, the maximum luminance is 1000 cd/m$^2$, and the minimum luminance is 0 cd/m$^2$.

In this manner, the master monitor information can be described in AppInfoBDMV( ) in the Index table. Describing the master monitor information in AppInfoBDMV( ) enables operation of one type of color gamut and dynamic range in the entire optical disc 11.

Note that video_format illustrated in FIG. 6 represents a video format (scanning system) recorded in the optical disc 11, and frame_rate represents a video frame rate recorded in the optical disc 11.

2-2. Second Description Example of Master Monitor Information

An example of describing the master monitor information in Indexes( ) in the Index table will be described.

FIG. 8 is a diagram illustrating a syntax of Indexes( ) illustrated in FIG. 5.

Indexes( ) includes 16-bit number_of_Titles, and also includes 2-bit Title_object_type and 2-bit Title_access_type for each Title identified by title_id.

Number_of_Titles represents the number of Titles included in Indexes( ). Title represents a section of a content reproduced using one or more PlayLists.

Title_object_type represents the type of a title, and Title_access_type represents the type of a title reproduction start.

Further, Indexes( ) includes 4-bit mastering_monitor_info for each Title identified by title_id.

This differs from the syntax of Indexes( ) in "Blu-ray Disc Read-Only Format Part3 version2.4" in that the number of bits of a reserve area is reduced and mastering_monitor_info is added. Mastering_monitor_info is the above-mentioned master monitor information. The meaning of the value of mastering_monitor_info is the same as the meaning described above with reference to FIG. 7.

In this manner, the master monitor information can be described in Indexes( ) in the Index table. Describing the master monitor information in Indexes( ) enables operation of one type of color gamut and dynamic range in units of Title.

Switching of values (switching between a color gamut and a dynamic range) in each Title can be limited, so that effects due to switching of the display luminance in consideration of Graphics (PG, IG) and the like can be reduced. If one Title includes a section in which only a video is displayed and a section in which a graphic is superimposed on a video and the color gamut and the dynamic range are switched at a timing when the display of the graphic is started, the color and brightness of the video are changed. Such a phenomenon can be prevented.

FIG. 9 is a diagram illustrating another syntax of Indexes ( ).

Descriptions with reference to FIG. 9 that are the same as the descriptions made above with reference to FIG. 8 are omitted as appropriate. In the above description, the color gamut and dynamic range are represented by one type of information of mastering_monitor_info. However, information indicating the color gamut and information indicating the dynamic range may be described.

The example of FIG. 9 differs from the syntax illustrated in FIG. 8 in that 4-bit mastering_monitor_color_primaries and 4-bit mastering_monitor_luminance are described instead of mastering_monitor_info.

Mastering_monitor_color_primaries and mastering_monitor_luminance are master monitor information. Mastering_monitor_color_primaries represents the color gamut of the master monitor, and mastering_monitor_luminance represents the dynamic range of the master monitor.

FIG. 10 is a diagram illustrating an example of mastering_monitor_color_primaries.

Mastering_monitor_color_primaries=1 indicates that the color gamut is unknown.

Mastering_monitor_color_primaries=2 indicates that the color gamut is BT.709.

Mastering_monitor_color_primaries=3 indicates that the color gamut is DCI P3.

Mastering_monitor_color_primaries=4 indicates that the color gamut is BT.2020.

FIG. 11 is a diagram illustrating an example of mastering_monitor_luminance

Mastering_monitor_luminance=1 indicates that the maximum luminance and the minimum luminance are unknown.

Mastering_monitor_luminance=2 indicates that the maximum luminance is 400 cd/m² and the minimum luminance is 0 cd/m².

Mastering_monitor_luminance=3 indicates that the maximum luminance is a luminance in a range of 400 to 800 cd/m² and the minimum luminance is 0 cd/m².

Mastering_monitor_luminance=4 indicates that the maximum luminance is 800 cd/m² and the minimum luminance is 0 cd/m².

Mastering_monitor_luminance=5 indicates that the maximum luminance is a luminance in a range of 800 to 1000 cd/m² and the minimum luminance is 0 cd/m².

Mastering_monitor_luminance=6 indicates that the maximum luminance is 1000 cd/m² and the minimum luminance is 0 cd/m².

A reserve area having a large number of bits is ensured in an area (Title[title_id]( ) of each Title of Indexes( ). In an area in which the reserve area having a large number of bits is ensured, information indicating the color gamut and information indicating the dynamic range can be described.

2-3. Third Description Example of Master Monitor Information

An example in which the master monitor information is described in ExtensionData( ) (FIG. 5) in the Index table will be described.

FIG. 12 is a diagram illustrating a syntax of ExtensionData( ).

ExtensionData( ) includes 16-bit values ID1 and ID2 for each ext_data_entry( ). A combination of values ID1 and ID2 indicates the content of information described in data_block( ) in ext_data_entry( ).

FIG. 13 is a diagram illustrating a meaning of a combination of values ID1 and ID2.

For example, the value ID1 of 0x0001 and the value ID2 of 0x0001 indicate that information described in data_block ( ) is pip_metadata. Pip_metadata is information about a Picture in Picture function.

Note that, as described later, ExtensionData( ) is also included in PlayList and Clip Information. The content of information described in ExtensionData( ) of each of PlayList and Clip Information is represented by a combination of values ID1 and ID2 illustrated in FIG. 13.

Further, the value ID1 representing a predetermined value of 0xaaaa and the value ID2 representing a predetermined value of 0xbbbb indicate that the information described in data_block( ) is UHD_Ext. UHD_Ext is the master monitor information. This differs from the meaning of a combination of values ID1 and ID2 in "Blu-ray Disc Read-Only Format Part3 version2.4" in that UHD_Ext is added.

FIG. 14 is a diagram illustrating a first example of UHD_Ext( ) described as data_block( ).

UHD_Ext( ) illustrated in FIG. 14 includes mastering_monitor_info. Mastering_monitor_info of UHD_Ext( ) indicates the same meaning as that illustrated in FIG. 7.

FIG. 15 is a diagram illustrating a second example of UHD_Ext( ).

UHD_Ext( ) illustrated in FIG. 15 includes mastering_monitor_color_primaries and mastering_monitor_luminance Both mastering_monitor_color_primaries and mastering_monitor_luminance of UHD_Ext( ) have the same meanings as the meanings illustrated in FIGS. 10 and 11, respectively.

FIG. 16 is a diagram illustrating a third example of UHD_Ext( ).

UHD_Ext( ) illustrated in FIG. 16 includes display_primaries_x, display_primaries_y, white_point_x, white_point_y, max_display_mastering_luminance, and min_display_mastering_luminance.

These pieces of information are the same as the information in HEVC coded data as supplemental enhancement information (SEI). This example indicates the color gamut and dynamic range of the master monitor by using the information that is the same as the information inserted in the HEVC coded data as SEI.

Display_primaries_x and display_primaries_y represent the color gamut (color space) of the master monitor, and white_point_x and white_point_y represent the position of white in the color gamut. Max_display_mastering_luminance and min_display_mastering_luminance represent a maximum value and a minimum value of the luminance, i.e., the dynamic range of the luminance, of the master monitor.

In this manner, the master monitor information can be described in ExtensionData( ) in the Index table. The use of ExtensionData( ) makes it possible to define the master monitor information in a free form, without affecting the number of bits of the reserve area. For example, the master monitor information can be defined together with another extended parameter for compatibility with 4K, or the master monitor information that can be operated in the entire disc, or for each title, can be defined.

2-4. Fourth Description Example of Master Monitor Information

Next, an example in which the master monitor information is described in PlayList will be described.

FIG. 17 is a diagram illustrating a syntax of PlayList.

PlayList is a file which is stored in the PLAYLIST directory illustrated in FIG. 4 and to which an extension ".mpls" is set. AppInfoPlayList( ) PlayList( ) PlayListMark( ) and ExtensionData( ) are described in PlayList.

Parameters related to the reproduction control of PlayList, such as reproduction limitation, are stored in AppInfoPlayList( ).

Parameters related to Main Path and Sub Path are stored in PlayList( ).

PlayListMark( ) stores mark PlayList mark information, i.e., information about a mark as a jump destination(jump point) in a user operation, a command, or the like for instructing chapter jump or the like.

ExtensionData( ) is information including various pieces of information for extending PlayList.

FIG. 18 is a diagram illustrating a syntax of AppInfoPlayList( ) illustrated in FIG. 17.

8-bit PlayList_playback_type, 1-bit PlayList_random_access_flag, 1-bit audio_mix_app_flag, 1-bit lossless_may_bypass_mixer_flag, 1-bit MVC_Base_view_R_flag are described in AppInfoPlayList( ).

PlayList_playback_type represents the type of reproduction of PlayItem included in PlayList, such as sequential reproduction or random reproduction. Further, PlayList_random_access_flag indicates whether or not to allow a random access to a reproduction start position indicated by PlayList. Audio_mix_app_flag indicates whether or not to synthesize audio data in a reproduction section indicated by PlayList.

Further, each of 4-bit mastering_monitor_color_primaries and mastering_monitor_luminance is described in AppInfoPlayList( ) This differs from the syntax of AppInfoPlayList ( ) in "Blu-ray Disc Read-Only Format Part3 version2.4" in that the number of bits of a reserve area is reduced and mastering_monitor_color_primaries and mastering_monitor_luminance are added.

In this example, mastering_monitor_color_primaries and mastering_monitor_luminance are described as the master monitor information. However, 4-bit mastering_monitor_info may be described in AppInfoPlayList( ).

In this manner, the master monitor information can be described in AppInfoPlayList( ) in PlayList. Describing the master monitor information in PlayList enables operation of one type of color gamut and dynamic range in units of PlayList. In a case where a plurality of PlayLists is used for reproducing one Title, different color gamuts and dynamic ranges can be operated in one Title.

2-5. Fifth Description Example of Master Monitor Information

An example in which the master monitor information is described in ExtensionData( ) (FIG. 17) in PlayList will be described.

ExtensionData( ) in PlayList includes a syntax similar to the syntax illustrated in FIG. 12. The content of information included in ExtensionData( ) is represented by a combination of values ID1 and ID2, and UHD_Ext illustrated in FIG. 14, FIG. 15, or FIG. 16 is described in ExtensionData( ) in PlayList.

Describing the master monitor information in ExtensionData( ) in PlayList makes it possible to define the color gamut and dynamic range that are operated in units of PlayList file in a free form.

2-6. Sixth Description Example of Master Monitor Information

An example in which the master monitor information is described in Clip Information will be described.

FIG. 19 is a diagram illustrating a syntax of Clip Information.

Clip Information is a file which is stored in the CLIPINF directory illustrated in FIG. 4 and to which an extension ".clpi" is set.

ClipInfo( ) stores information indicating the type of an AV stream constituting Clip, information indicating the recording rate of the AV stream, and the like.

SequenceInfo( ) includes information indicating a position of a source packet constituting an AV stream on the time axis, information indicating a display time, and the like.

ProgramInfo( ) includes information about PID of an AV stream constituting Clip and encoding of the AV stream, and the like.

CPI( ) includes information indicating a position of a source packet serving as an entry point, and the like.

ExtensionData( ) is information including various pieces of information for extending a Clip Information file.

FIG. 20 is a diagram illustrating a syntax of ClipInfo( ) illustrated in FIG. 19.

Each of 8-bit Clip_stream_type and 8-bit application_type is described in ClipInfo( ).

Clip_stream_type represents the type of a Clip AV stream corresponding to the Clip Information file. Application_type represents a Clip Information file and an application (function) implemented using the corresponding Clip AV stream. The content of a description in a subsequent stage is switched depending on the value of application_type.

Further, 4-bit mastering_monitor_color_primaries and mastering_monitor_luminance are described in ClipInfo( ). This differs from the syntax of ClipInfo( ) in "Blu-ray Disc Read-Only Format Part3 version2.4" in that the number of bits of a reserve area is reduced and mastering_monitor_color_primaries and mastering_monitor_luminance are added.

Also in this example, mastering_monitor_color_primaries and mastering_monitor_luminance are described as the master monitor information, and 4-bit mastering_monitor_info may be described in ClipInfo( ).

In this manner, the master monitor information can be described in Clip Information file. This makes it possible to define the color gamut and dynamic range in Clip units which are finer authoring units. In a case where a plurality of Clips is referred to by one PlayList, an operation in which the color gamut and dynamic range are changed for each Clip can be performed.

Instead of describing the master monitor information subsequent to Clip_stream_type and application_type, mastering_monitor_color_primaries and mastering_monitor_luminance may be described at another position in ClipInfo( ). In this case, a value indicating an application for outputting a content with a wide color gamut and HDR is defined as the value of application_type.

FIG. 21 is a diagram illustrating an example of application_type.

As illustrated in FIG. 21, an application is allocated to each of application_type values 1 to 9. For example, application_type=1 indicates that the Clip AV stream corresponding to Clip Information including application_type=1 is MainTS of a movie referred to by main-path and the reproduction thereof is performed using Clip Information and Clip AV stream.

Application_type=10 indicates that the Clip AV stream corresponding to Clip Information including application_type=10 is MainTS of a movie, which is referred to by main-path has a wide color gamut and HDR, and the reproduction thereof is performed using Clip Information and Clip AV stream.

This differs from application_type in "Blu-ray Disc Read-Only Format Part3 version2.4" in that application_type=10 is added.

FIG. 22 is a diagram illustrating an example of ClipInfo ( ) including application_type=10.

In a case where application_type=10, as illustrated in FIG. 22, mastering_monitor_color_primaries and mastering_monitor_luminance are described in ClipInfo( ).

In this manner, in a case where a value indicating the function of reproducing video data having a wide color gamut and HDR is defined as application_type and the value is set as application_type, the master monitor information can be described in ClipInfo( ).

2-7. Seventh Description Example of Master Monitor Information

An example in which the master monitor information is described in ProgramInfo( ) (FIG. 19) of Clip Information.

FIG. 23 is a diagram illustrating a syntax of ProgramInfo ( ) illustrated in FIG. 19.

Number_of_program_sequences represents the number of program sequences described in ProgramInfo( ) Each program sequence is composed of a sequence of source packets constituting a program.

SPN_program_sequence_starf[i] represents a head source packet number of a program sequence.

StreamCodingInfo( ) includes information about encoding of an AV stream constituting Clip.

FIG. 24 is a diagram illustrating a syntax of StreamCodingInfo( ) illustrated in FIG. 23.

Stream_coding_type represents an encoding system for an elementary stream included in an AV stream. In a case where the value of stream_coding_type is one of 0x02, 0x1B, and 0xEA, StreamCodingInfo includes 4-bit video_format, 4-bit frame_rate, 4-bit aspect_ratio, and 1-bit cc_flag.

Video_format represents a scanning system for a video. Frame_rate represents a frame rate of a video stream. Aspect_ratio represents an aspect ratio of a video. Cc_flag is a 1-bit flag and indicates whether or not closed caption data is included in a video stream.

Further, in a case where the value of stream_coding_type is one of 0xNN, which is a predetermined value, and 0xMM, which is another predetermined value, not only video_format, frame_rate, aspect_ratio, and cc_flag, but also mastering_monitor_color_primaries and mastering_monitor_luminance, which are master monitor information, are described in StreamCodingInfo( ).

This differs from the syntax of StreamCodingInfo in "Blu-ray Disc Read-Only Format Part3 version2.4" in that stream_coding_type=0xNN, 0xMM is defined and mastering_monitor_color_primaries and mastering_monitor_luminance are described in StreamCodingInfo.

FIG. 25 is a diagram illustrating an example of stream_coding_type.

For example, stream_coding_type=0x02 indicates that the Clip AV stream corresponding Clip Information including stream_coding_type=0x02 is an MPEG-2 video stream. Stream_coding_type=0x1B indicates that the Clip AV stream corresponding to Clip Information including stream_coding_type=0x1B is an MPEG-4 AVC video stream.

Further, stream_coding_type=0xNN indicates that the Clip AV stream corresponding to Clip Information including stream_coding_type=0xNN is an HEVC video stream. Stream_coding_type=0xMM indicates that the Clip AV stream corresponding to Clip Information including stream_coding_type=0xMM is an HEVC video stream of HDR.

When a value indicating the HEVC video stream and the HEVC video stream of HDR is added to stream_coding_type, as illustrated in FIG. 26, a value indicating the scanning system for UHD is also added to video_format.

Video_format=8 indicates that the scanning system is 2160p and the color gamut is BT.2020. This differs from video_format in "Blu-ray Disc Read-Only Format Part3 version2.4" in that video_format=8 is defined.

In this manner, the master monitor information can be described in StreamCodingInfo( ) StreamCodingInfo( ) includes basic information about a video to be reproduced, such as the scanning system and frame rate of the video. These pieces of information are used, for example, at the time of setting communication to be performed with the display device 2 via an HDMI. The master monitor information is described in StreamCodingInfo( ) as such basic information, thereby making it possible to transmit not only the scanning system and frame rate of the video, but also the color gamut and dynamic range, to the display device 2 in a scheme similar to that used at the time of setting communication via the HDMI.

2-8. Eighth Description Example of Master Monitor Information

An example in which the master monitor information is described in ExtensionData( ) (FIG. 19) of Clip Information will be described.

ExtensionData( ) of Clip Information also includes a syntax similar to the syntax illustrated in FIG. 12. The content of information included in ExtensionData( ) is represented by a combination of values ID1 and ID2, and UHD_Ext illustrated in FIG. 14, FIG. 15, or FIG. 16 is described in ExtensionData( ) of Clip Information.

Describing the master monitor information in ExtensionData( ) of Clip Information, thereby making it possible to define the color gamut and dynamic range that can be operated in units of Clip Information file in a free form.

Modified Examples

In the above description, the master monitor information is described at one position in the Data Base information, but instead may be described at a plurality of positions. For example, information indicating the dynamic range can be described in the Index table, and information indicating the color gamut can be described in the Clip Information.

In this manner, information indicating the dynamic range and information indicating the color gamut can be separately described at a plurality of positions.

Further, the position where the master monitor information is described is not limited to the example described above, and can be described at another position where a reserve area is ensured. For example, the master monitor information can be described in information about each PlayItem included in PlayList( ) illustrated in FIG. 17, or the master monitor information can be described in information about each SubPlayItem.

Further, the master monitor information may be information indicating only the color gamut of the master monitor, or only the dynamic range of the luminance of the master monitor. Specifically, the master monitor information may be information indicating at least one of the color gamut and the dynamic range of the luminance of the master monitor.

3. Regarding the Configuration of Each Device

The configuration of each device will now be described. [Configuration of Reproduction Device 1]

Figure 27:
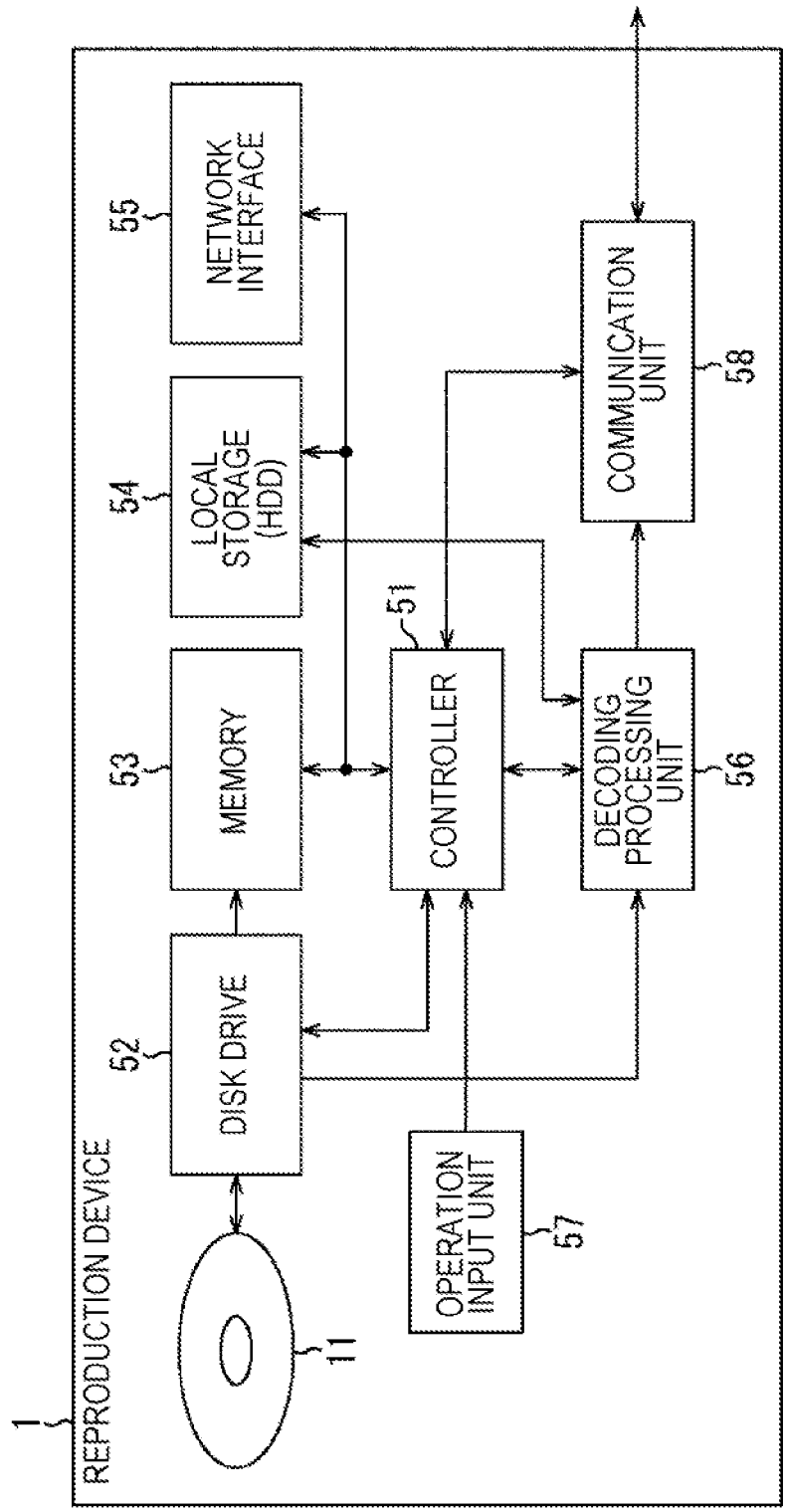
FIG. 27 is a block diagram illustrating a configuration example of a reproduction device.

FIG. 27 is a block diagram illustrating a configuration example of the reproduction device 1.

The reproduction device 1 includes a controller 51, a disk drive 52, a memory 53, a local storage 54, a network interface 55, a decoding processing unit 56, an operation input unit 57, and a communication unit 58.

The controller 51 is composed of a CPU, a ROM, a RAM, and the like. The controller 51 executes a predetermined program and controls the overall operation of the reproduction device 1.

The disk drive 52 reads out data from the optical disc 11, and outputs the read data to the controller 51, the memory 53, or the decoding processing unit 56. For example, the disk drive 52 outputs the Data Base information read out from the optical disc 11 to the controller 51, and outputs the HEVC video stream to the decoding processing unit 56.

The memory 53 stores data and the like necessary for the controller 51 to execute various processings.

The local storage 54 is composed of, for example, a hard disk drive (HDD). A stream downloaded from a server and the like are recorded in the local storage 54.

The network interface 55 communicates with the server via a network such as the Internet, and supplies the local storage 54 with the data downloaded from the server.

The decoding processing unit 56 decodes the video stream supplied from the disk drive 52, and outputs the video data obtained through decoding to the communication unit 58.

The operation input unit 57 is composed of an input device, such as buttons, keys, and a touch panel, and a reception unit that receives a signal, such as an infrared ray, which is transmitted from a predetermined remote commander. The operation input unit 57 detects a user operation and supplies the controller 51 with a signal indicating the content of the detected operation.

The communication unit 58 performs communication with the display device 2 via the cable 3. For example, the communication unit 58 acquires information about the performance of the display included in the display device 2, and outputs the information to the controller 51. Further, the communication unit 58 outputs the video data supplied from the decoding processing unit 56 to the display device 2.

Figure 28:
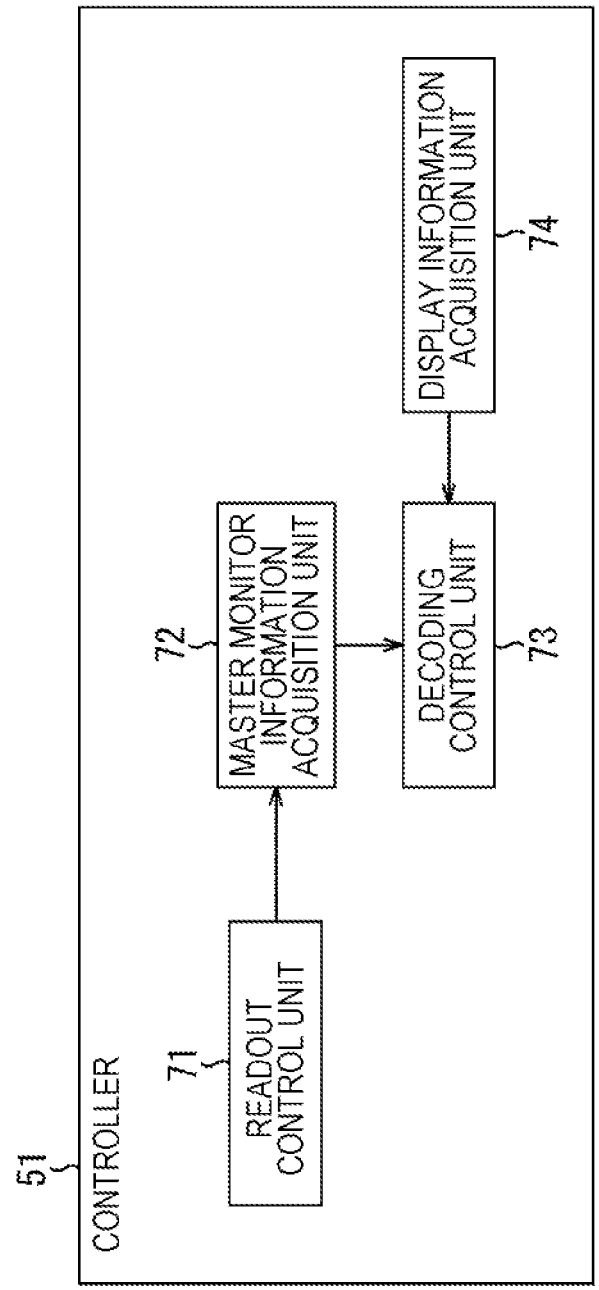
FIG. 28 is a block diagram illustrating a configuration example of a controller illustrated in FIG. 27.

FIG. 28 is a block diagram illustrating a configuration example of the controller 51 illustrated in FIG. 27.

The controller 51 includes a readout control unit 71, a master monitor information acquisition unit 72, a decoding control unit 73, and a display information acquisition unit 74.

The readout control unit 71 controls the disk drive 52, and reads out and acquires various data from the optical disc 11. For example, the readout control unit 71 reads out a file of a video stream and supplies the file to the decoding processing unit 56, and reads out a file of Data Base information and outputs the file to the master monitor information acquisition unit 72.

The master monitor information acquisition unit 72 acquires the master monitor information from the file supplied from the readout control unit 71. As described above, the master monitor information is described at the respective positions of Index table, PlayList, and Clip Information.

For example, as described above with reference to the first description example, in a case where the master monitor information is described in AppInfoBDMV( ) in the Index table, the master monitor information acquisition unit 72 acquires the master monitor information from the Index table supplied from the readout control unit 71.

Further, as described above with reference to the fourth description example, in a case where the master monitor information is described in AppInfoPlayList( ) in the PlayList, the master monitor information acquisition unit 72 acquires the master monitor information from the PlayList supplied from the readout control unit 71.

As described above with reference to the sixth description example, in a case where the master monitor information is described in ClipInfo( ) of Clip Information, the master monitor information acquisition unit 72 acquires the master monitor information from the Clip Information supplied from the readout control unit 71.

The decoding control unit 73 specifies the master monitor, i.e., the color gamut and the dynamic range of the content recorded in the optical disc 11, on the basis of the master monitor information supplied from the master monitor information acquisition unit 72. Further, the decoding control unit 73 specifies the performance of the display device 2 on the basis of the information supplied from the display information acquisition unit 74.

The decoding control unit 73 controls the processing of the decoding processing unit 56 on the basis of the color gamut and dynamic range of the content and the performance of the display device 2.

For example, the decoding control unit 73 controls the decoding processing unit 56 and decodes the video stream. Further, in a case where the color gamut and dynamic range of the content exceed the color gamut and dynamic range of the display included in the display device 2, the video data obtained through decoding is converted into data with a reduced color gamut and dynamic range.

In a case where the display device 2 can understand the master monitor information output from the reproduction device 1, the decoding control unit 73 outputs the master monitor information supplied from the master monitor information acquisition unit 72 to the communication unit 58. The master monitor information supplied from the communication unit 58 is output to the display device 2 together with the video data obtained through decoding by the decoding processing unit 56.

The display information acquisition unit 74 acquires the information indicating the performance of the display device 2 that is acquired by the communication unit 58, and outputs the information to the decoding control unit 73. The information indicating the performance of the display device 2 includes information indicating whether or not the display device 2 can understand the master monitor information output from the reproduction device 1, and information indicating the color gamut and dynamic range of the display included in the display device 2.

For example, the master monitor information is described in each of an essential area of a data format used for HDMI communication and an option area in option areas. In a case where the display device 2 is not compatible with processing for the information described in the option area, it is determined that the display device 2 cannot understand the master monitor information output from the reproduction device 1.

Figure 29:
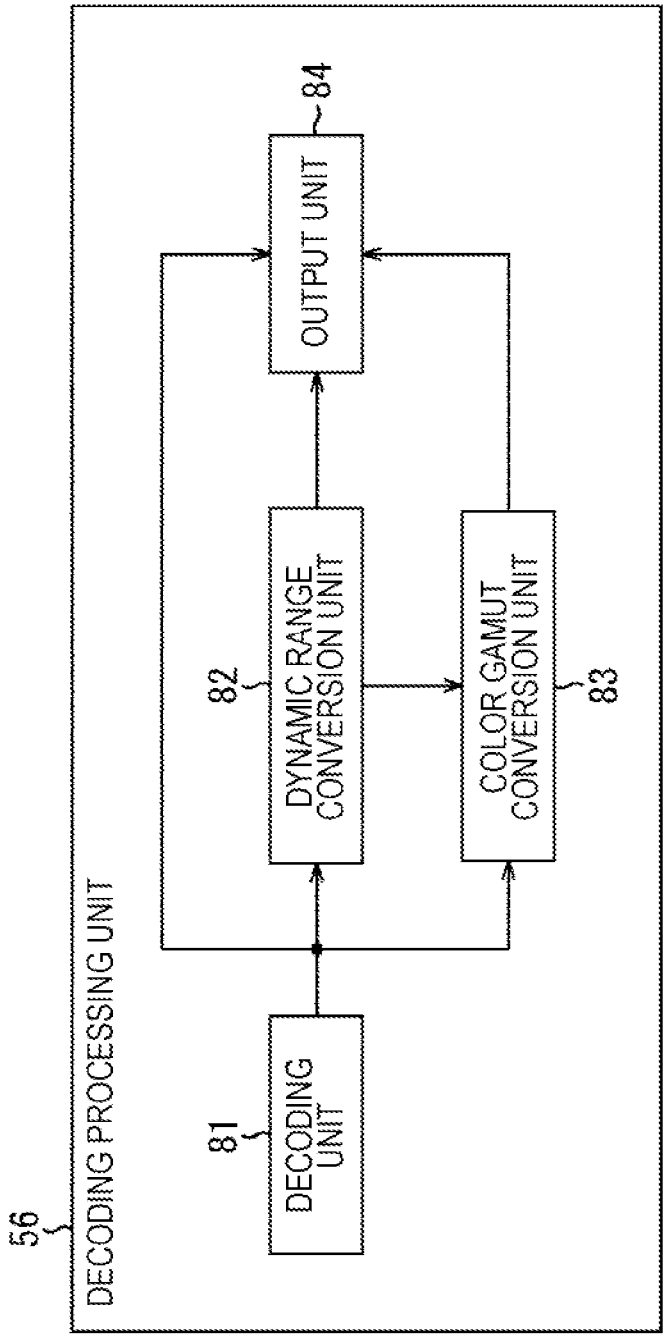
FIG. 29 is a block diagram illustrating a configuration example of a decoding processing unit illustrated in FIG. 27.

FIG. 29 is a block diagram illustrating a configuration example of the decoding processing unit 56 illustrated in FIG. 27.

The decoding processing unit 56 includes a decoding unit 81, a dynamic range conversion unit 82, a color gamut conversion unit 83, and an output unit 84. A video stream read out by the disk drive 52 is input to the decoding unit 81.

The decoding unit 81 decodes the video stream and outputs the video data obtained through decoding. The video data output from the decoding unit 81 is supplied to each of the dynamic range conversion unit 82, the color gamut conversion unit 83, and the output unit 84.

In a case where the dynamic range of the video data exceeds the dynamic range of the display included in the display device 2, the dynamic range conversion unit 82 converts the video data supplied from the decoding unit 81 into data with a reduced dynamic range. In a case where there is a need to reduce not only the dynamic range but also the color gamut, the dynamic range conversion unit 82 outputs the converted video data to the color gamut conversion unit 83, and in a case where there is no need to reduce the color gamut, the dynamic range conversion unit 82 outputs the converted video data to the output unit 84.

The color gamut conversion unit 83 converts the video data supplied from the decoding unit 81, or the video data supplied from the dynamic range conversion unit 82, into data with a reduced color gamut. The color gamut conversion unit 83 outputs the video data obtained after the conversion of the color gamut to the output unit 84.

The output unit 84 outputs, to the communication unit 58, the video data supplied from the decoding unit 81, the video data supplied from the dynamic range conversion unit 82, or the video data supplied from the color gamut conversion unit 83.

[Configuration of Display Device 2]

Figure 30:
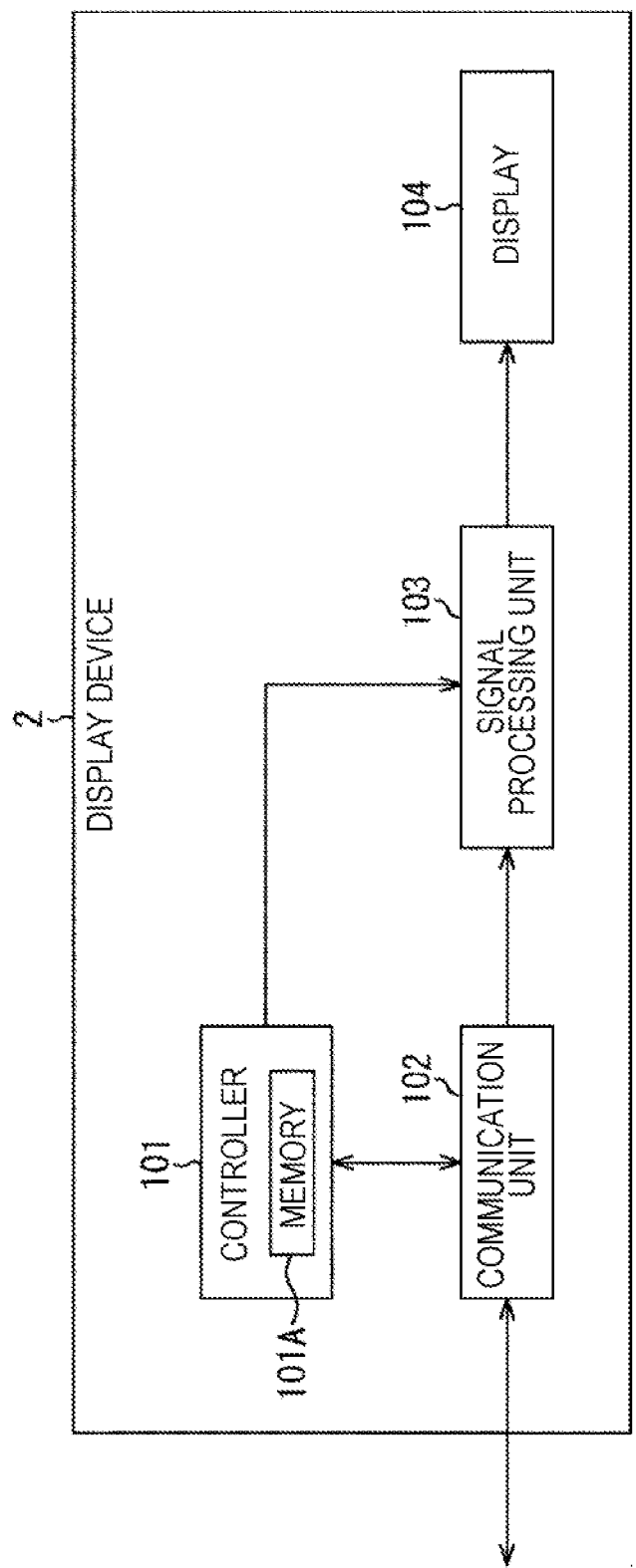
FIG. 30 is a block diagram illustrating a configuration example of a display device.

FIG. 30 is a block diagram illustrating a configuration example of the display device 2.

The display device 2 includes a controller 101, a communication unit 102, a signal processing unit 103, and a display 104. The controller 101 includes a memory 101A.

The controller 101 is composed of a CPU, a ROM, a RAM, and the like. The controller 101 executes a predetermined program and controls the overall operation of the display device 2.

For example, the controller 101 causes the memory 101A to store extended display identification data (EDID) indicating the performance of the display 104 and manages the EDID. The controller 101 outputs the EDID stored in the memory 101A to the communication unit 102 during authentication with the reproduction device 1, and transmits the EDID to the reproduction device 1. On the basis of the EDID, the performance of the display 104 is specified by the reproduction device 1.

Further, the controller 101 controls the communication unit 102 and transmits, to the reproduction device 1, information indicating whether or not the reproduction device 1 is compatible with the master monitor information output from the reproduction device 1.

The communication unit 102 communicates with the reproduction device 1 via the cable 3. The communication unit 102 receives the video data transmitted from the reproduction device 1, and outputs the video data to the signal processing unit 103. In a case where the master monitor information as well as the video data is transmitted from the reproduction device 1, the communication unit 102 outputs the received master monitor information to the controller 101. Further, the communication unit 102 transmits the information supplied from the controller 101 to the reproduction device 1.

The signal processing unit 103 causes the display 104 to display the video of the content on the basis of the video data supplied from the communication unit 102. The signal processing unit 103 performs, as needed, conversion of the color gamut of the video data and conversion of the dynamic range of the video data in accordance with the control operation by the controller 101.

Figure 31:
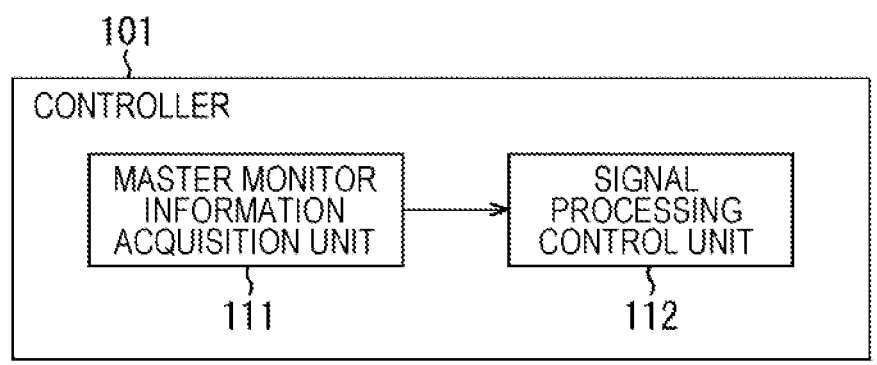
FIG. 31 is a block diagram illustrating a configuration example of a controller illustrated in FIG. 30.

FIG. 31 is a block diagram illustrating a configuration example of the controller 101 illustrated in FIG. 30.

The controller 101 includes a master monitor information acquisition unit 111 and a signal processing control unit 112.

In a case where the video data as well as the master monitor information output from the reproduction device 1 is received by the communication unit 102, the master monitor information acquisition unit 111 acquires the master monitor information and outputs the master monitor information to the signal processing control unit 112.

The signal processing control unit 112 specifies the color gamut and dynamic range of the video data transmitted from the reproduction device 1 on the basis of the master monitor information. In a case where the color gamut and dynamic range of the video data exceed the performance of the display 104, the signal processing control unit 112 causes the signal processing unit 103 to perform conversion processing for compressing the color gamut and dynamic range.

Figure 32:
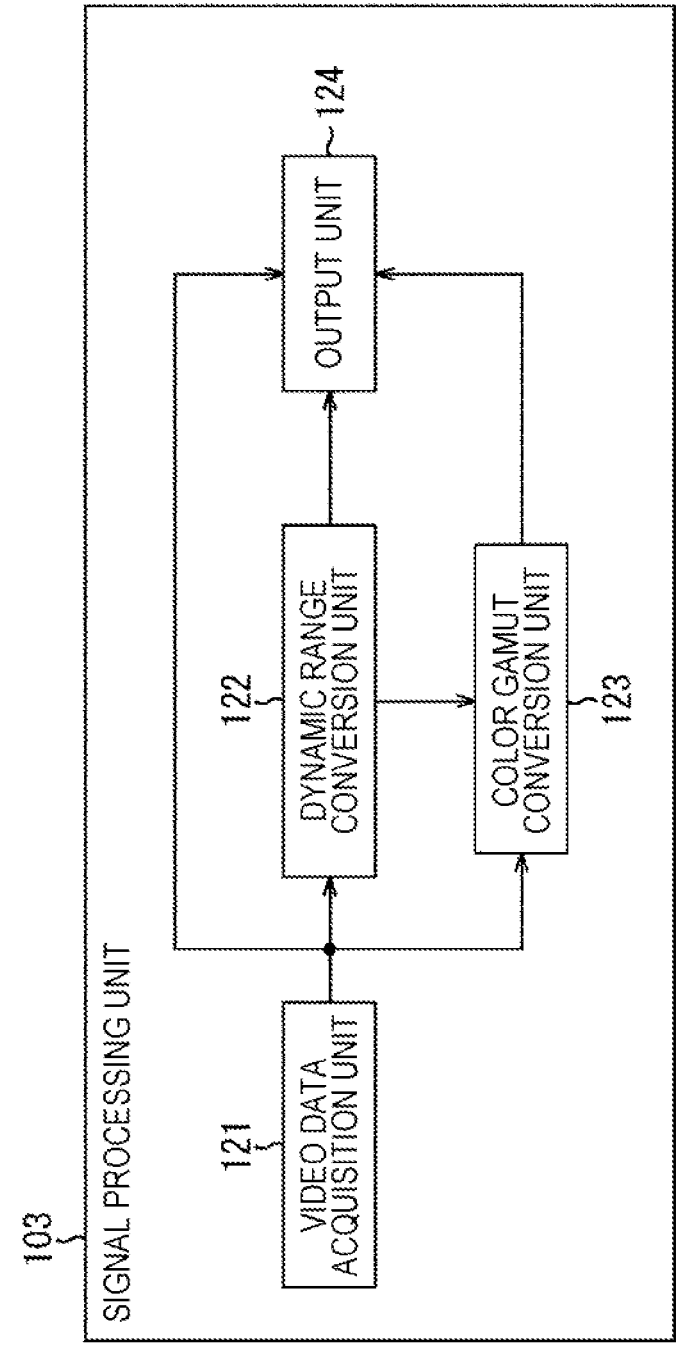
FIG. 32 is a block diagram illustrating a configuration example of a signal processing unit illustrated in FIG. 30.

FIG. 32 is a block diagram illustrating a configuration example of the signal processing unit 103 illustrated in FIG. 30.

The signal processing unit 103 includes a video data acquisition unit 121, a dynamic range conversion unit 122, a color gamut conversion unit 123, and an output unit 124. The video data output from the communication unit 102 is input to the video data acquisition unit 121.

The video data acquisition unit 121 acquires the video data output from the communication unit 102 and outputs the acquired video data. The video data output from the video data acquisition unit 121 is supplied to each of the dynamic range conversion unit 122, the color gamut conversion unit 123, and the output unit 124.

In a case where the dynamic range of the video data exceeds the dynamic range of the display 104, the dynamic range conversion unit 122 converts the video data supplied from the video data acquisition unit 121 into data with a reduced dynamic range. In a case where there is a need to reduce not only the dynamic range but also the color gamut, the dynamic range conversion unit 122 outputs the converted video data to the color gamut conversion unit 123, and in a case where there is no need to reduce the color gamut, the dynamic range conversion unit 122 outputs the converted video data to the output unit 124.

The color gamut conversion unit 123 converts the video data supplied from the video data acquisition unit 121, or the video data supplied from the dynamic range conversion unit 122, into data with a reduced color gamut. The color gamut conversion unit 123 outputs the video data obtained after the conversion of the color gamut to the output unit 124.

The output unit 124 outputs, to the display 104, one of the video data supplied from the video data acquisition unit 121, the video data supplied from the dynamic range conversion unit 122, and the video data supplied from the color gamut conversion unit 123.

4. Regarding the Operation of Each Device

The operation of each device having the configuration as described above will now be described.

Pre-Reproduction Processing

First, processing performed by the reproduction device 1 before the reproduction of the optical disc 11 is started will be described with reference to the flowchart of FIG. 33.

Processing illustrated in FIG. 33 is started when, for example, power supplies of the reproduction device 1 and the display device 2 which are connected via the cable 3 are turned on.

In step S1, the communication unit 58 of the reproduction device 1 receives information of, for example, an EDID format, which is transmitted from the display device 2 and indicates the performance of the display 104, i.e., the color gamut and dynamic range of the display 104.

In step S2, the communication unit 58 receives the information which is transmitted from the display device 2 and indicates whether or not the display device 2 is compatible with the master monitor information, and terminates the processing. The information received by the communication unit 58 is supplied to the controller 51 and is acquired by the display information acquisition unit 74.

Next, processing performed by the display device 2 before the reproduction of the optical disc 11 is started will be described with reference to the flowchart of FIG. 34.

In step S11, the communication unit 102 of the display device 2 transmits, to the reproduction device 1, information of, for example, an EDID format, which is read out from the memory 101A and indicates the color gamut and dynamic range of the display 104.

In step S12, the communication unit 102 transmits information indicating whether or not the display device 2 is compatible with the master monitor information (information indicating whether or not the display device can understand the master monitor information), and terminates the processing.

[Reproduction Processing of Reproduction Device 1]

Next, reproduction processing performed by the reproduction device 1 will be described with reference to the flowcharts of FIGS. 35 and 36.

In step S21, the readout control unit 71 of the controller 51 controls the disk drive 52 and reads out Data Base information from the optical disc 11. The readout control unit 71 outputs, to the master monitor information acquisition unit 72, Index table, PlayList, and Clip Information, which are the read Data Base information.

In step S22, the master monitor information acquisition unit 72 acquires the master monitor information from the Data Base information. The master monitor information from the Data Base information is acquired every time the master monitor information is switched.

For example, in a case where the master monitor information is described in PlayList, the master monitor information is acquired every time PlayList used for reproduction is switched. Further, in a case where the master monitor information is described in Clip Information, the master monitor information is acquired every time Clip Information used for reproduction is switched. Information other than the master monitor information included in Data Base information is used for, for example, reproduction of a video stream.

In step S23, the decoding control unit 73 determines whether or not the display device 2 is compatible with the master monitor information on the basis of the information acquired by the display information acquisition unit 74 when the processing illustrated in FIG. 33 is performed.

In a case where it is determined in step S23 that the display device 2 is compatible with the master monitor information, the readout control unit 71 controls the disk drive 52 and reads out a video stream from the optical disc 11 in step S24. The video stream read out from the optical disc 11 is supplied to the decoding processing unit 56.

In step S25, the decoding unit 81 of the decoding processing unit 56 decodes the video stream supplied from the disk drive 52. The video data obtained through decoding is supplied to the communication unit 58 via the output unit 84.

In step S26, the communication unit 58 outputs, to the display device 2, the master monitor information acquired and supplied by the master monitor information acquisition unit 72 of the controller 51 and the video data obtained through decoding by the decoding processing unit 56. After that, reading and decoding of a video stream are continuously performed, and when the reproduction of, for example, a last video stream is completed, the processing ends.

On the other hand, in a case where it is determined in step S23 that the display device 2 is not compatible with the master monitor information, the decoding control unit 73 determines whether or not the display 104 is compatible with the color gamut of the content (video stream) in step S27. In this case, the determination is made on the basis of the master monitor information acquired by the master monitor information acquisition unit 72 and the information indicating the performance of the display 104 that is acquired by the display information acquisition unit 74.

For example, in a case where the color gamut of the content does not exceed the color gamut of the display, like when the color gamut of the content and the color gamut of the display are each BT.2020, it is determined that the display 104 is compatible with the color gamut of the content. Further, in a case where the color gamut of the content is wider than the color gamut of the display, like when the color gamut of the content is BT.2020 and the color gamut of the display is BT.709, it is determined that the display 104 is not compatible with the color gamut of the content.

In a case where it is determined in step S27 that the display 104 is compatible with the color gamut of the content, the decoding control unit 73 determines in step S28 whether or not the display 104 is compatible with the dynamic range of the content. Also in this case, the determination is made on the basis of the master monitor information acquired by the master monitor information acquisition unit 72 and the information indicating the performance of the display 104 that is acquired by the display information acquisition unit 74.

In a case where it is determined in step S28 that the display 104 is compatible with the dynamic range of the content, the readout control unit 71 controls the disk drive 52 and reads out a video stream from the optical disc 11 in step S29.

In step S30, the decoding unit 81 of the decoding processing unit 56 decodes the video stream supplied from the disk drive 52. The video data obtained through decoding is supplied to the communication unit 58 via the output unit 84.

In step S31, the communication unit 58 outputs the video data obtained through decoding by the decoding processing unit 56 to the display device 2. After that, reading and decoding of a video stream are continuously performed, and when the reproduction of, for example, a last video stream is completed, the processing ends.

In this manner, in a case where the display device 2 cannot understand the master monitor information, the master monitor information read out from the optical disc 11 is not output, but instead only the video data obtained by decoding the video stream is output.

Further, in a case where the display 104 is compatible with both the color gamut and the dynamic range of the content, the video data obtained through decoding is directly output to the display device 2, without performing conversion processing for, for example, reducing the color gamut, or reducing the dynamic range.

On the other hand, in a case where it is determined in step S28 that the display 104 is not compatible with the dynamic range of the content, the readout control unit 71 controls the disk drive 52 and reads out a video stream from the optical disc 11 in step S32.

In step S33, the decoding unit 81 of the decoding processing unit 56 decodes the video stream supplied from the disk drive 52. The video data obtained through decoding is supplied to the dynamic range conversion unit 82.

In step S34, the dynamic range conversion unit 82 refers to the master monitor information, and converts the video data obtained through decoding by the decoding unit 81 into data with a reduced dynamic range.

For example, in a case where the dynamic range of the content is 0 to 400 $cd/m^2$, while the dynamic range of the display 104 is 0 to 300 $cd/m^2$, processing for compressing the dynamic range of the content into a range of 0 to 300 $cd/m^2$ is performed.

In step S35, the communication unit 58 outputs the video data obtained after the conversion of the dynamic range to the display device 2. After that, reading and decoding of a video stream are continuously performed, and when the reproduction of, for example, a last video stream is completed, the processing ends.

On the other hand, in a case where it is determined in step S27 that the display 104 is not compatible with the color gamut of the content, the decoding control unit 73 determines in step S36 (FIG. 36) whether or not the display 104 is compatible with the dynamic range of the content.

In a case where it is determined in step S36 that the display 104 is compatible with the dynamic range of the content, the readout control unit 71 controls the disk drive 52 and reads out a video stream from the optical disc 11 in step S37.

In step S38, the decoding unit 81 of the decoding processing unit 56 decodes the video stream supplied from the disk drive 52.

In step S39, the color gamut conversion unit 83 refers to the master monitor information, and converts the video data obtained through decoding by the decoding unit 81 into data with a reduced color gamut.

For example, in a case where the color gamut of the content is BT.2020, while the color gamut of the display 104 is BT.709, processing for compressing the color gamut of the content into the color gamut of BT.709 is performed.

In step S40, the communication unit 58 outputs the video data obtained after the conversion of the color gamut conversion to the display device 2. After that, reading and decoding of a video stream and conversion of the color gamut are continuously performed, and when the reproduction of, for example, a last video stream is completed, the processing ends.

On the other hand, in a case where it is determined in step S36 that the display 104 is not compatible with the dynamic range of the content, the readout control unit 71 controls the disk drive 52 and reads out a video stream from the optical disc 11 in step S41.

In step S42, the decoding unit 81 of the decoding processing unit 56 decodes the video stream supplied from the disk drive 52. The video data obtained through decoding is supplied to the dynamic range conversion unit 82.

In step S43, the dynamic range conversion unit 82 refers to the master monitor information, and converts the video data obtained through decoding by the decoding unit 81 to data with a reduced dynamic range. In addition, the color gamut conversion unit 83 refers to the master monitor information, and further converts the video data obtained after the conversion of the dynamic range by the dynamic range conversion unit 82 into data with a reduced color gamut. The video data obtained after the conversion of the dynamic range and the color gamut is output from the color gamut conversion unit 83 to the output unit 84, and is supplied to the communication unit 58.

In step S44, the communication unit 58 outputs the video data obtained after the conversion of the dynamic range and the color gamut to the display device 2. After that, reading of a video stream, decoding of the read video stream, and conversion of the dynamic range and color gamut are continuously performed, and when the reproduction of, for example, a last video stream is completed, the processing ends.

As described above, in a case where the display device 2 is compatible with the master monitor information, the video data obtained through decoding is directly output together with the master monitor information, regardless of the performance of the display 104.

Further, in a case where the display device 2 is not compatible with the master monitor information, the video data obtained through decoding is directly output, or the video data obtained after the conversion of at least one of the dynamic range and the color gamut is output.

[Display Processing of Display Device 2]

Next, display processing performed by the display device 2 will be described with reference to the flowchart of FIG. 37.

Figure 35:
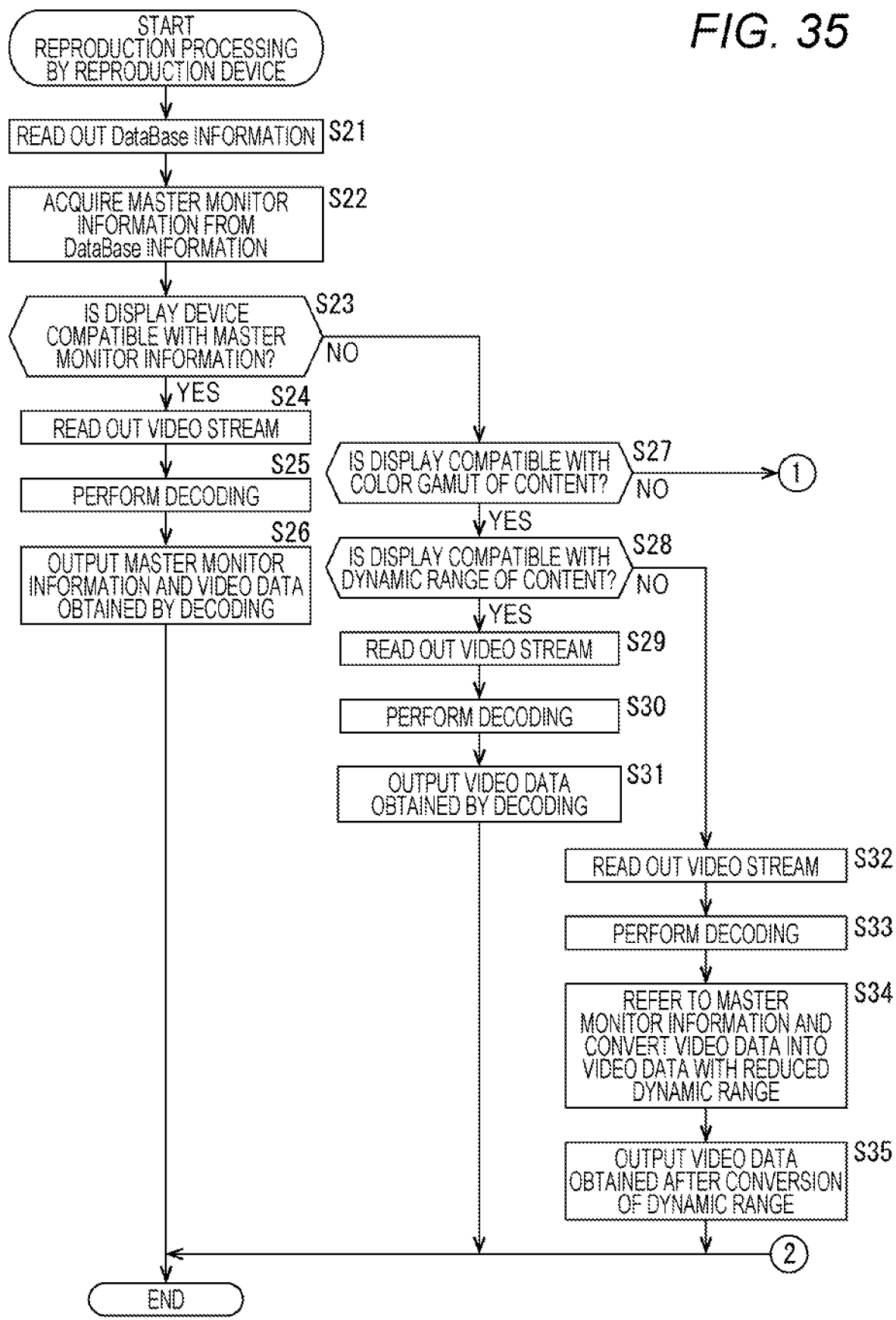
FIG. 35 is a flowchart illustrating reproduction processing performed by the reproduction device.
Figure 36:
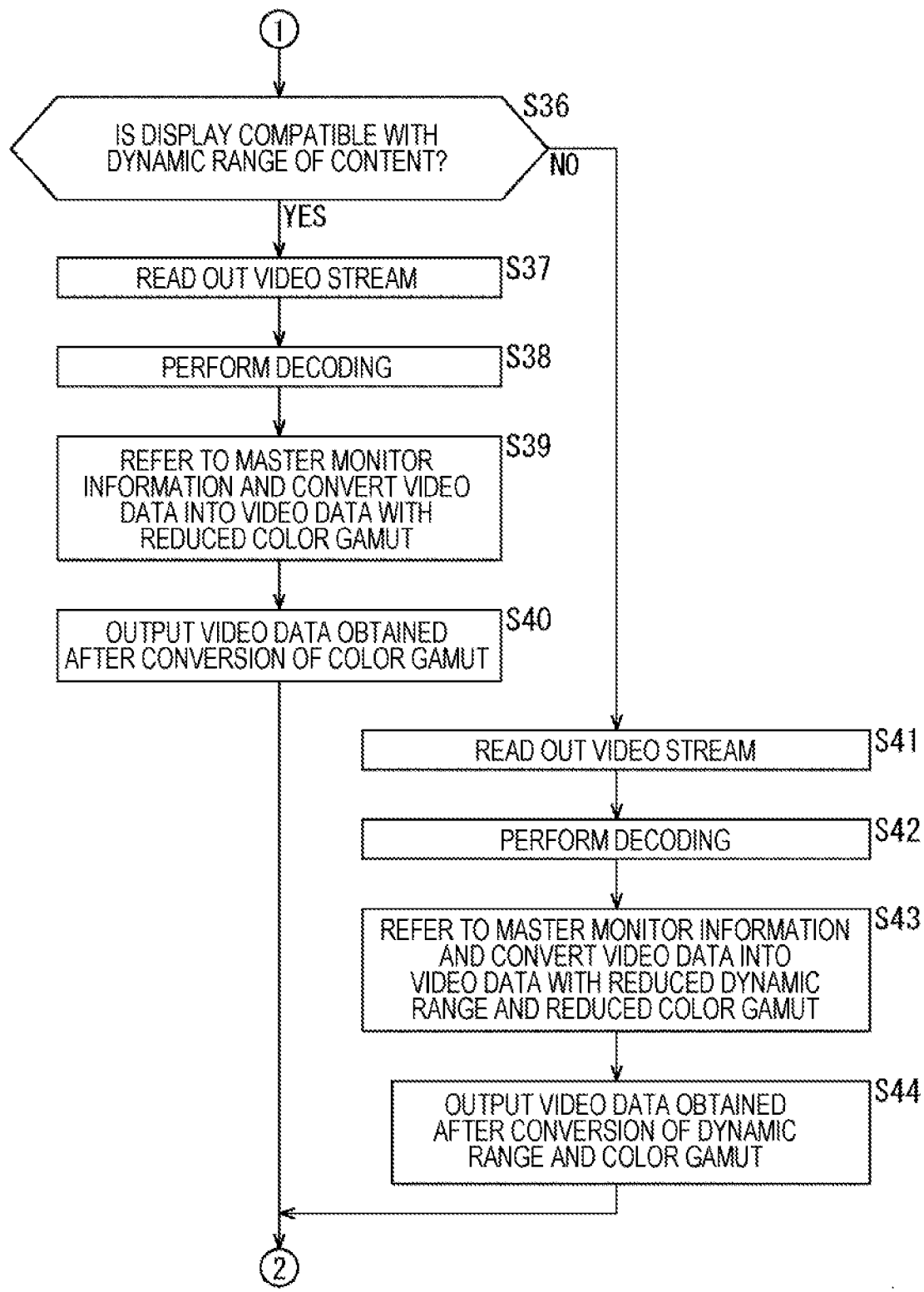
FIG. 36 is a flowchart that follows FIG. 35 and illustrates reproduction processing performed by the reproduction device.
Figure 37:
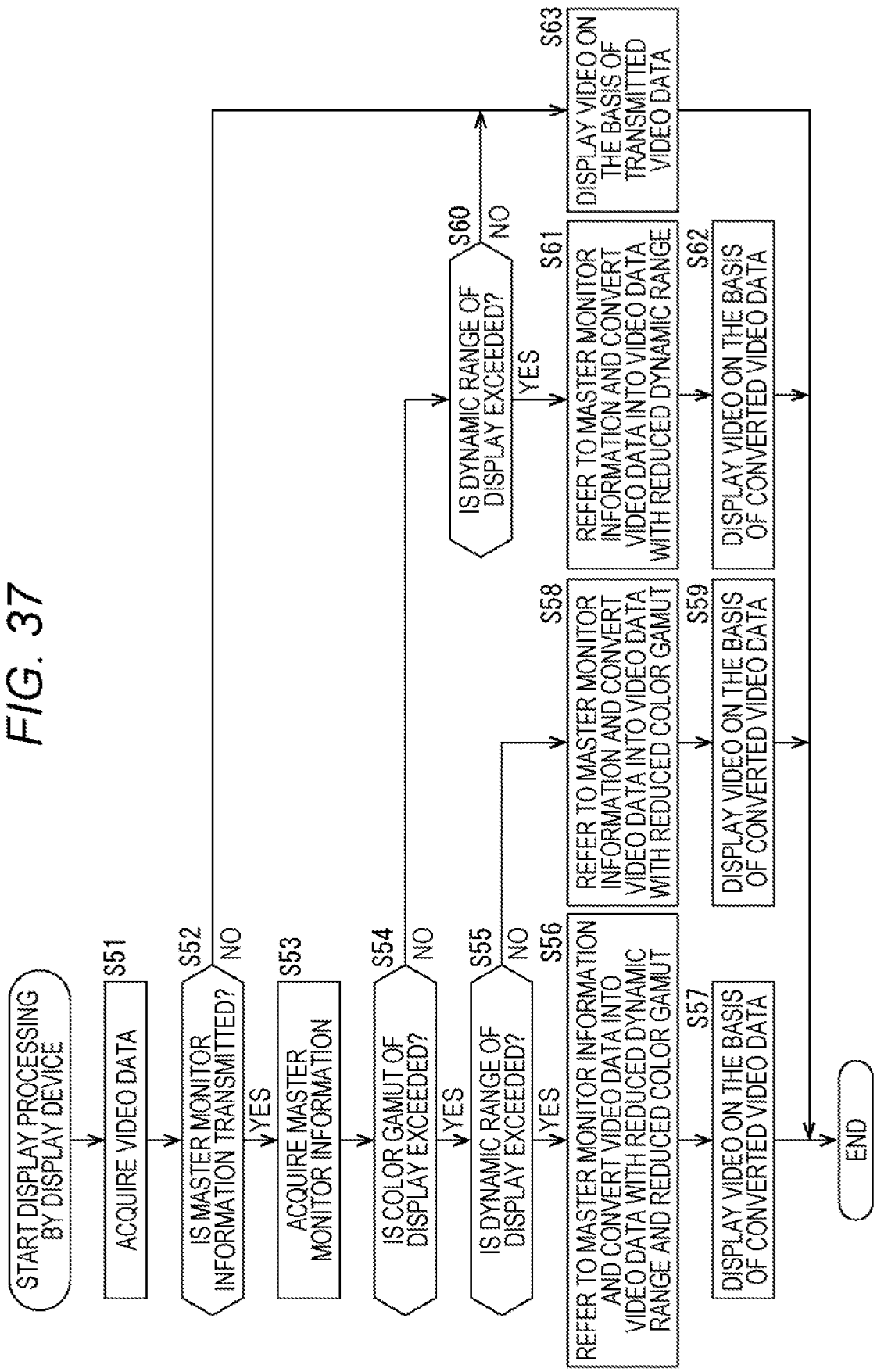
FIG. 37 is a flowchart illustrating display processing performed by the display device.

Processing illustrated in FIG. 37 is started when the processing illustrated in FIG. 35 and FIG. 36 is performed by the reproduction device 1 and the video data is transmitted. The transmitted video data is received by the communication unit 102.

In step S51, the video data acquisition unit 121 of the signal processing unit 103 acquires the video data received by the communication unit 102.

In step S52, the communication unit 102 determines whether or not the master monitor information as well as the video data is transmitted from the reproduction device 1. The transmission of the master monitor information as well as the video data indicates that the display device 2 is compatible with the master monitor information. As described above, in a case where the display device 2 is compatible with the master monitor information, the video data obtained by decoding the video stream is directly transmitted to the display device 2.

In a case where it is determined in step S52 that the master monitor information is transmitted, the master monitor information acquisition unit 111 of the controller 101 acquires the master monitor information transmitted together with the video data in step S53. The acquired master monitor information is supplied to the signal processing control unit 112.

In step S54, the signal processing control unit 112 determines whether or not the color gamut of the video data that is transmitted from the reproduction device 1 and is represented by the master monitor information exceeds the color gamut of the display 104.

In a case where it is determined in step S54 that the color gamut of the video data exceeds the color gamut of the display 104, the signal processing control unit 112 determines in step S55 whether or not the dynamic range of the video data represented by the master monitor information exceeds the dynamic range of the display 104.

In a case where it is determined in step S55 that the dynamic range of the video data exceeds the dynamic range of the display 104, the signal processing control unit 112 causes the signal processing unit 103 to convert the dynamic range and color gamut of the video data in step S56.

Specifically, the dynamic range conversion unit 122 of the signal processing unit 103 converts the video data acquired by the video data acquisition unit 121 into video data having a dynamic range that can be displayed on the display 104.

Further, the color gamut conversion unit 123 converts the video data having the converted dynamic range into video data having a color gamut that can be displayed on the display 104. The converted video data having the reduced dynamic range and color gamut is output to the output unit 124.

In step S57, the output unit 124 displays the video of the content on the display 104 on the basis of the video data obtained after the conversion of the dynamic range and color gamut. The processing described above is continuously performed. When the reproduction of the content is completed, the processing ends.

On the other hand, in a case where it is determined in step S55 that the dynamic range of the video data does not exceed the dynamic range of the display 104, the signal processing control unit 112 causes the signal processing unit 103 to convert the video data in step S58.

Specifically, the color gamut conversion unit 123 of the signal processing unit 103 converts the video data acquired by the video data acquisition unit 121 into video data having a color gamut that can be displayed on the display 104. Since the dynamic range of the video data does not exceed the dynamic range of the display, only the processing for converting the video data to data having a reduced color gamut is performed. The converted video data that is converted so as to have a reduced color gamut is output to the output unit 124.

In step S59, the output unit 124 causes the display 104 to display the video of the content on the basis of the video data obtained after the conversion of the color gamut. The processing described above is continuously performed. When the reproduction of the content is completed, the processing ends.

On the other hand, in a case where it is determined in step S54 that the color gamut of the video data does not exceed the color gamut of the display 104, the signal processing control unit 112 determines in step S60 whether or not the dynamic range of the video data exceeds the dynamic range of the display 104.

In a case where it is determined in step S60 that the dynamic range of the video data exceeds the dynamic range of the display 104, the signal processing control unit 112 refers to the master monitor information and causes the signal processing unit 103 to convert the video data transmitted from the reproduction device 1 in step S61.

Specifically, the dynamic range conversion unit 122 of the signal processing unit 103 converts the video data acquired by the video data acquisition unit 121 into video data having a dynamic range that can be displayed on the display 104. The converted video data that is converted so as to have a reduced dynamic range is output to the output unit 124.

In step S62, the output unit 124 causes the display 104 to display the video of the content on the basis of the video data obtained after the conversion of the dynamic range. The processing described above is continuously performed. When the reproduction of the content is completed, the processing ends.

On the other hand, in a case where it is determined in step S52 that the display device 2 is not compatible with the master monitor information and thus the master monitor information is not transmitted, the output unit 124 of the signal processing unit 103 causes the display 104 to display the video of the content on the basis of the video data acquired by the video data acquisition unit 121 in step S63.

Also in a case where it is determined in step S60 that the dynamic range of the video data does not exceed the dynamic range of the display 104, the video of the content is displayed on the basis of the video data acquired by the video data acquisition unit 121 in step S63. In a case where the display device 2 is a device that is compatible with the master monitor information and the transmitted video data is video data that can be displayed on the display 104, the video data transmitted from the reproduction device 1 is directly used for displaying the video.

The video is displayed by directly using the video data transmitted from the reproduction device 1, and when the reproduction of the content is completed, the processing ends.

By the processing described above, the actual color gamut and dynamic range of the content recorded in the optical disc 11 are transferred from the reproduction device 1 to the display device 2.

Further, in a case where the color gamut and dynamic range of the content recorded in the optical disc 11 exceed the performance of the display 104, processing for reducing the color gamut and dynamic range is performed on the basis of the actual color gamut and dynamic range.

In the above description, when the display device 2 is compatible with the master monitor information, conversion processing for reducing the color gamut and dynamic range is performed by the display device 2, but instead may be performed by the reproduction device 1. In this case, the conversion processing performed by the reproduction device 1 when the color gamut and dynamic range of the content recorded in the optical disc 11 exceed the performance of the display 104 is performed in the similar manner to the processing of step S43 illustrated in FIG. 36.

Second Embodiment

In the above description, the master monitor information is included in the Data Base information recorded in the optical disc 11, but instead may be included in a video stream. In a case where the video stream is an HEVC video stream, the master monitor information is inserted into HEVC coded data as supplemental enhancement information (SEI). The HEVC video stream in which SEI is inserted into HEVC coded data is recorded in the optical disc 11 in a BD format.

Figure 38:
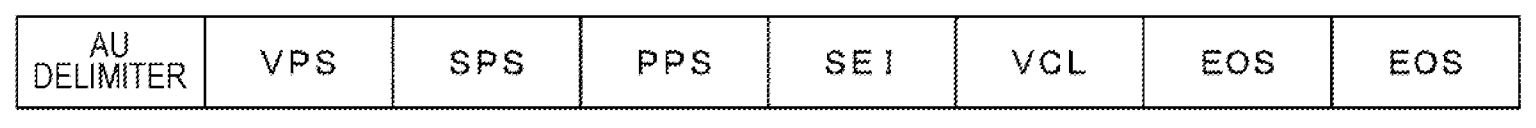

FIG. 38 is a diagram illustrating the configuration of an access unit of HEVC.

A HEVC video stream is composed of an access unit which is a set of network abstraction layer (NAL) units. One access unit includes video data of one picture.

As illustrated in FIG. 38, one access unit is composed of an access unit (AU) delimiter, a video parameter set (VPS), a sequence parameter set (SPS), a picture parameter set (PPS), an SEI, video coding layer (VCL), an end of sequence (EOS), and an end of stream (EOS).

The AU delimiter indicates the head of an access unit. The VPS includes metadata indicating a content of a bit stream. The SPS includes information, such as a picture size and a coding tree block (CTB) size, which needs to be referred to by the HEVC decoder through sequence decoding processing. The PPS includes information that needs to be referred to by the HEVC decoder to execute picture decoding processing. The VPS, the SPS, and the PPS are used as head information.

The SEI includes auxiliary information such as timing information about each picture and information about a random access. The master monitor information is included in the access unit as HEVC Mastering monitor information SEI. The VCL is data on one picture. The EOS (End of Sequence) indicates a sequence end position, and the EOS (End of Stream) indicates a stream end position.

FIG. 39 is a diagram illustrating a syntax of the HEVC Mastering monitor information SEI.

The HEVC Mastering monitor information SEI includes display_primaries_x, display_primaries_y, white_point_x, white_point_y, max_display_mastering_luminance, and min_display_mastering_luminance.

These pieces of information are the same as the information described above with reference to FIG. 16. Specifically, display_primaries_x and display_primaries_y represent the color gamut of the master monitor, and white_point_x and white_point_y represent the position of white in the color gamut. Max_display_mastering_luminance and min_display_mastering_luminance represent the dynamic range of the master monitor.

In this manner, in a case where the master monitor information is included in the video stream, as described above, when the master monitor information is also included in the Data Base information, the master monitor information included in the video stream is preferentially used.

There is a possibility that the master monitor information included in the video stream includes more detailed information than the master monitor information included in the Data Base information. For example, in a case where mastering_monitor_info, which is described above with reference to FIG. 7, is used as the master monitor information described in the Data Base information, the amount of the information is larger than the amount of information included in the video stream illustrated in FIG. 39.

When the master monitor information included in the video stream is preferentially used, processing can be performed efficiently and more accurately (in a form that better reflects the author's intention).

In a case where the master monitor information can be included in the video stream, information indicating whether or not the master monitor information is included in the corresponding video stream, as well as the master monitor information, is described in Clip Information as the Data Base information.

FIG. 40 is a diagram illustrating a part of ClipInfo( ) of Clip Information.

In addition to mastering_monitor_color_primaries and mastering_monitor_luminance, which are described above with reference to FIG. 20, 1-bit mastering_monitor_sei_paresent_flag is described in ClipInfo( ).

Mastering_monitor_sei_paresent_flag=1 indicates that the master monitor information illustrated in FIG. 39 is included in the corresponding to video stream. Further, mastering_monitor_sei_paresent_flag=0 indicates that the master monitor information is not included in the corresponding video stream.

In a case where the value of mastering_monitor_sei_paresent_flag is 1, processing is performed using the master monitor information included in the corresponding video stream, and in a case where the value is 0, processing is performed using the master monitor information included in ClipInfo( ).

The master monitor information may be described in the Index table or PlayList, and mastering_monitor_sei_paresent_flag may be included in Clip Information.

The reproduction processing performed by the reproduction device 1 will now be described with reference to the flowcharts of FIGS. 41 and 42.

Figure 41:
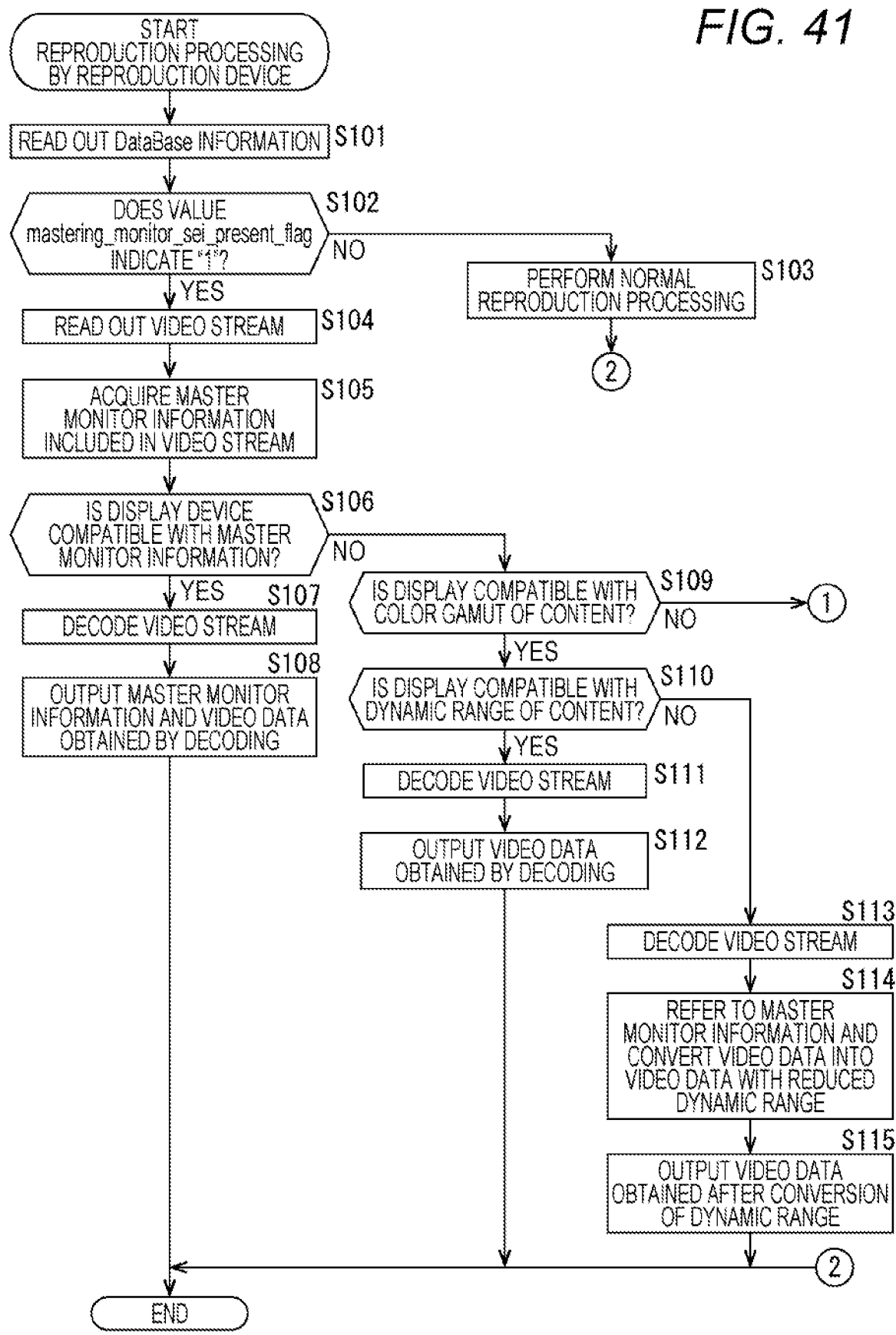
FIG. 41 is a flowchart illustrating reproduction processing performed by the reproduction device.
Figure 42:
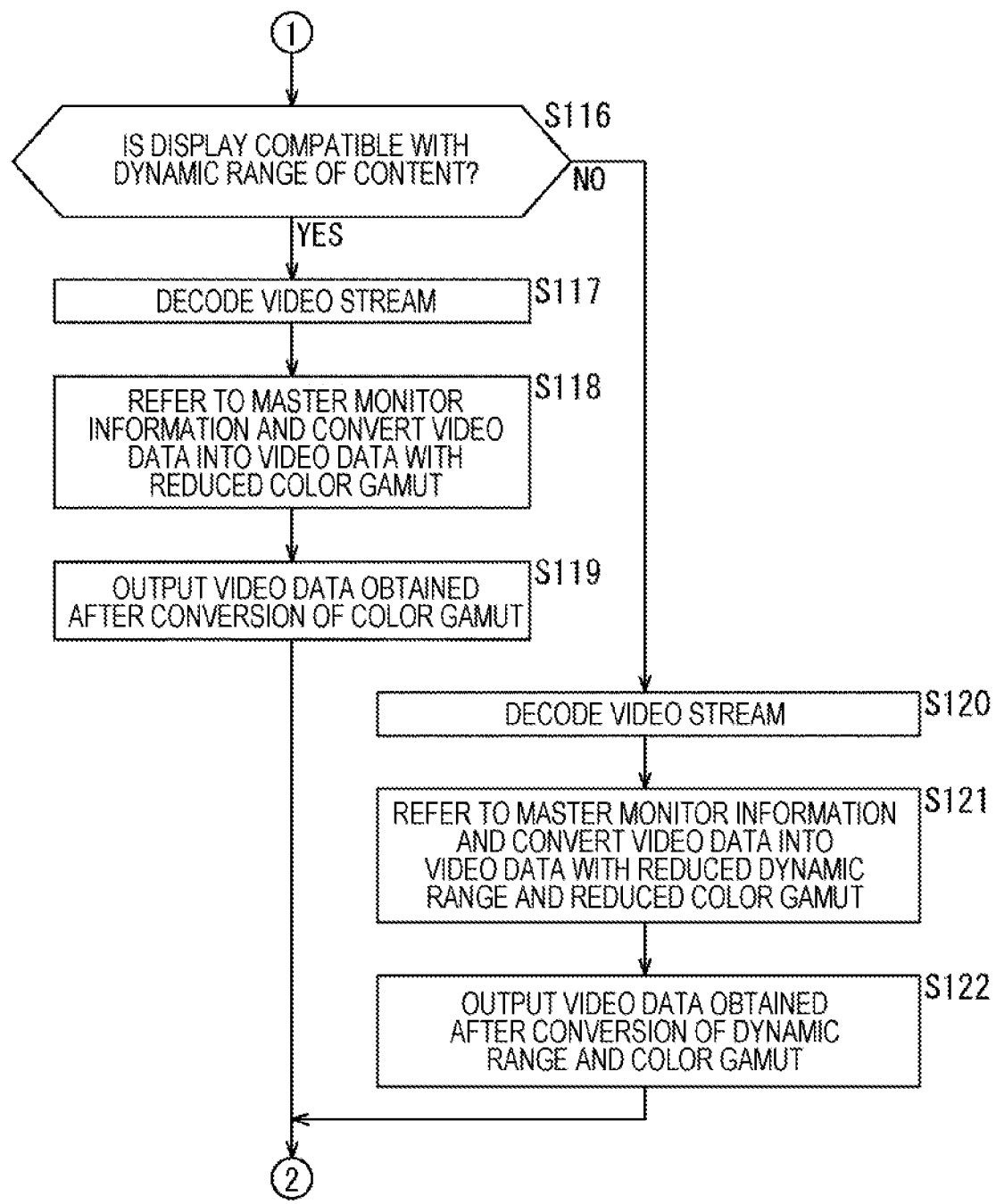
FIG. 42 is a flowchart that follows FIG. 41 and illustrates reproduction processing performed by the reproduction device.

The processing illustrated in FIGS. 41 and 42 is processing performed in a case where the master monitor information can be included not only in the Data Base information, but also in the video stream.

In step S101, the readout control unit 71 of the controller 51 controls the disk drive 52, and reads out the Data Base information from the optical disc 11.

In step S102, the readout control unit 71 determines whether or not the value of mastering_monitor_sei_paresent_flag included in the Clip Information is 1.

Since the master monitor information is included in the video stream corresponding to the Clip Information, in a case where it is determined that the value of mastering_monitor_sei_paresent_flag is not 1, the controller 51 performs normal reproduction processing in step S103. Specifically, the processing described above with reference to FIGS. 35 and 36 is performed using the master monitor information included in the Data Base information. After the normal reproduction processing in step S103 is performed, the processing is terminated.

On the other hand, in a case where it is determined that the value of mastering_monitor_sei_paresent_flag is 1, the readout control unit 71 controls the disk drive 52 and reads out a video stream from the optical disc 11 in step S104. The video stream read out from the optical disc 11 is supplied to the decoding processing unit 56.

In step S105, the master monitor information acquisition unit 72 analyzes the video stream supplied to the decoding processing unit 56, and acquires the master monitor information included in the video stream as SEI. The acquired master monitor information is supplied to the decoding control unit 73.

In step S106, the decoding control unit 73 determines whether or not the display device 2 is compatible with the master monitor information on the basis of the information acquired by the display information acquisition unit 74 by performing the processing illustrated in FIG. 33.

In a case where it is determined in step S106 that the display device 2 is compatible with the master monitor information, the decoding unit 81 of the decoding processing unit 56 decodes the video stream supplied from the disk drive 52 in step S107. The video data obtained through decoding is supplied to the communication unit 58 via the output unit 84.

In step S108, the communication unit 58 outputs, to the display device 2, the master monitor information acquired and supplied by the master monitor information acquisition unit 72 of the controller 51 and the video data obtained through decoding by the decoding processing unit 56. After that, reading and decoding of a video stream are continuously performed, and when the reproduction of, for example, a last video stream is completed, the processing ends.

On the other hand, in a case where it is determined in step S106 that the display device 2 is not compatible with the master monitor information, the decoding control unit 73 determines in step S109 whether or not the display 104 is compatible with the color gamut of the content. In this case, the determination is made on the basis of the master monitor information acquired by the master monitor information acquisition unit 72, and the information indicating the performance of the display 104 that is acquired by the display information acquisition unit 74.

In a case where it is determined in step S109 that the display 104 is compatible with the color gamut of the content, the decoding control unit 73 determines in step S110 whether or not the display 104 is compatible with the dynamic range of the content. In this case, the determination is made on the basis of the master monitor information acquired by the master monitor information acquisition unit 72, and the information indicating the performance of the display 104 that is acquired by the display information acquisition unit 74.

In a case where it is determined in step S110 that the display 104 is compatible with the dynamic range of the content, the decoding unit 81 of the decoding processing unit 56 decodes the video stream supplied from the disk drive 52 in step S111. The video data obtained through decoding is supplied to the communication unit 58 via the output unit 84.

In step S112, the communication unit 58 outputs, to the display device 2, the video data obtained through decoding by the decoding processing unit 56. After that, reading and decoding of a video stream are continuously performed, and when the reproduction of, for example, a last video stream is completed, the processing ends.

In this manner, in a case where the display device 2 cannot understand the master monitor information, the master monitor information acquired from the video stream is not output, but instead only the video data obtained by decoding the video stream is output.

On the other hand, in a case where it is determined in step S110 that the display 104 is not compatible with the dynamic range of the content, the decoding unit 81 of the decoding processing unit 56 decodes the video stream supplied from the disk drive 52 in step S113. The video data obtained through decoding is supplied to the dynamic range conversion unit 82.

In step S114, the dynamic range conversion unit 82 refers to the master monitor information, and converts the video data obtained through decoding by the decoding unit 81 into data with a reduced dynamic range.

In step S115, the communication unit 58 outputs the video data obtained after the conversion of the dynamic range to the display device 2. After that, reading and decoding of a video stream are continuously performed, and when the reproduction of, for example, a last video stream is completed, the processing ends.

On the other hand, in a case where it is determined in step S109 that the display 104 is not compatible with the color gamut of the content, the decoding control unit 73 determines in step S116 (FIG. 42) whether or not the display 104 is compatible with the dynamic range of the content.

In a case where it is determined in step S116 that the display 104 is compatible with the dynamic range of the content, the decoding unit 81 of the decoding processing unit 56 decodes the video stream supplied from the disk drive 52 in step S117.

In step S118, the color gamut conversion unit 83 refers to the master monitor information and coverts the video data obtained through decoding by the decoding unit 81 into data with a reduced color gamut.

In step S119, the communication unit 58 outputs the video data obtained after the conversion of the color gamut to the display device 2. After that, reading and decoding of a video stream are continuously performed, and when the reproduction of, for example, a last video stream is completed, the processing ends.

On the other hand, in a case where it is determined in step S116 that the display 104 is not compatible with the dynamic range of the content, the decoding unit 81 of the decoding processing unit 56 decodes the video stream supplied from the disk drive 52 in step S120. The video data obtained through decoding is supplied to the dynamic range conversion unit 82.

In step S121, the dynamic range conversion unit 82 refers to the master monitor information, and converts the video data obtained through decoding by the decoding unit 81 into data with a reduced dynamic range. Further, the color gamut conversion unit 83 refers to the master monitor information, and further converts the video data, which is obtained after the dynamic range is converted by the dynamic range conversion unit 82, into data with a reduced color gamut. The video data obtained after the conversion of the dynamic range and the color gamut is output from the color gamut conversion unit 83 to the output unit 84 and is supplied to the communication unit 58.

In step S122, the communication unit 58 outputs the video data obtained after the conversion of the dynamic range and color gamut to the display device 2. After that, reading of a video stream, decoding of the read video stream, and conversion of the dynamic range and color gamut are continuously performed, and when the reproduction of, for example, a last video stream is completed, the processing ends.

As described above, in a case where the master monitor information is included in both the video stream and the Data Base information, the master monitor information included in the video stream is preferentially used, processing can be performed efficiently and more accurately.

Note that the display device 2 performs processing similar to the processing described above with reference to FIG. 37 so as to correspond to the processing illustrated in FIGS. 41 and 42.

Regarding a Recording Device

Figure 43:
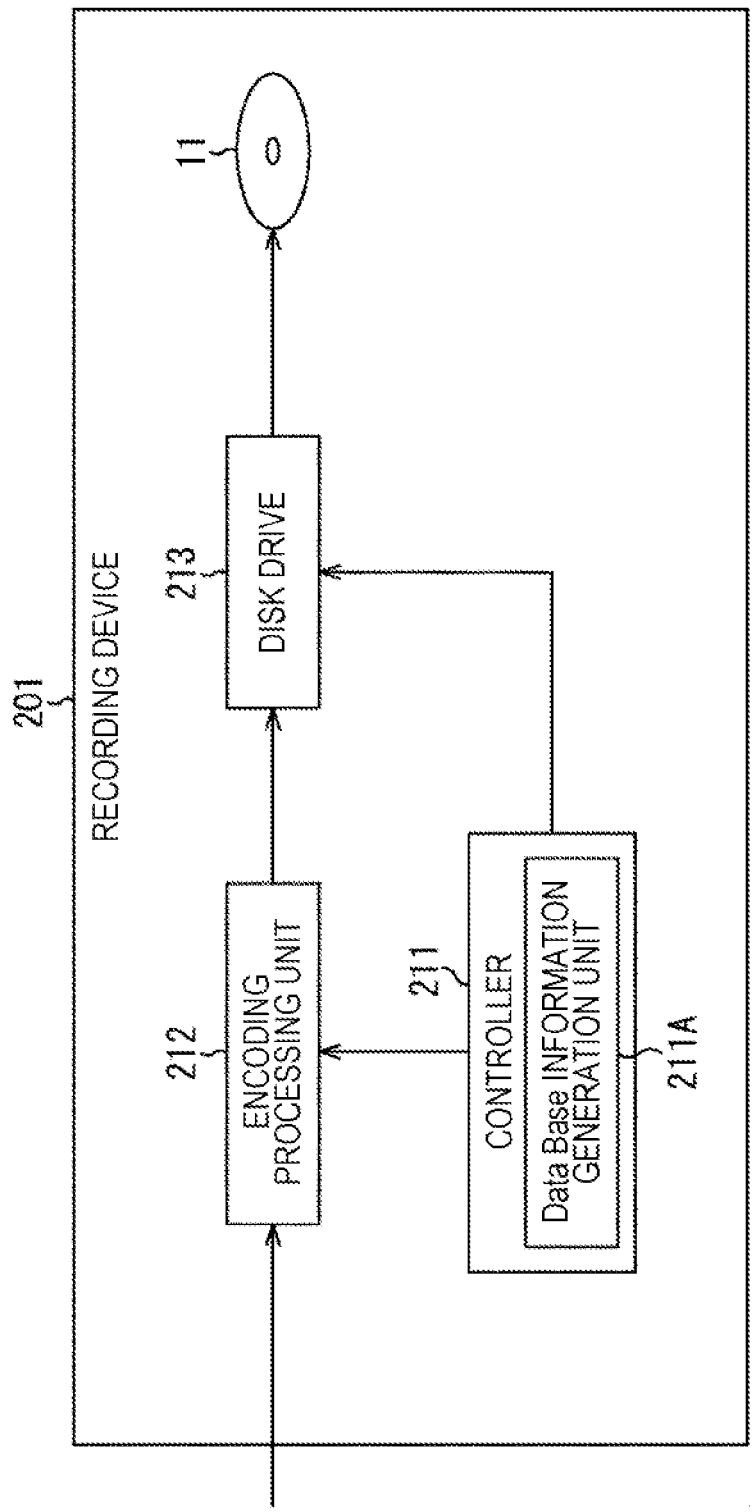
FIG. 43 is a block diagram illustrating a configuration example of a recording device.

FIG. 43 is a block diagram illustrating a configuration example of a recording device 201.

Data generated by the recording device 201 is recorded in the optical disc 11 and is reproduced in the reproduction device 1. In practice, copies of an optical disc are obtained on the basis of a master disc on which a content is recorded by the recording device 201, and one of the copies is provided to the reproduction device 1 as the optical disc 11 and is reproduced.

The recording device 201 includes a controller 211, an encoding processing unit 212, and a disk drive 213. Master video data which is generated by an author while confirming the display of the master monitor is input to the encoding processing unit 212.

The controller 211 is composed of a CPU, a ROM, a RAM, and the like. The controller 211 executes a predetermined program and controls the overall operation of the recording device 201.

The controller 211 executes a predetermined program, thereby implementing a Data Base information generation unit 211A. The Data Base information generation unit 211A generates Data Base information including the master monitor information as described above, and outputs the Data Base information to the disk drive 213.

The encoding processing unit 212 encodes the input video data according to a format such as HEVC. The encoding processing unit 212 outputs the video stream obtained by encoding the master video data to the disk drive 213. The video stream includes, as needed, the master monitor information as SEI.

The disk drive 213 records, on the optical disc 11, the Data Base information supplied from the controller 211 and a file storing the video stream supplied from the encoding processing unit 212 according to the directory structure illustrated in FIG. 4.

Recording Processing

Figure 44:
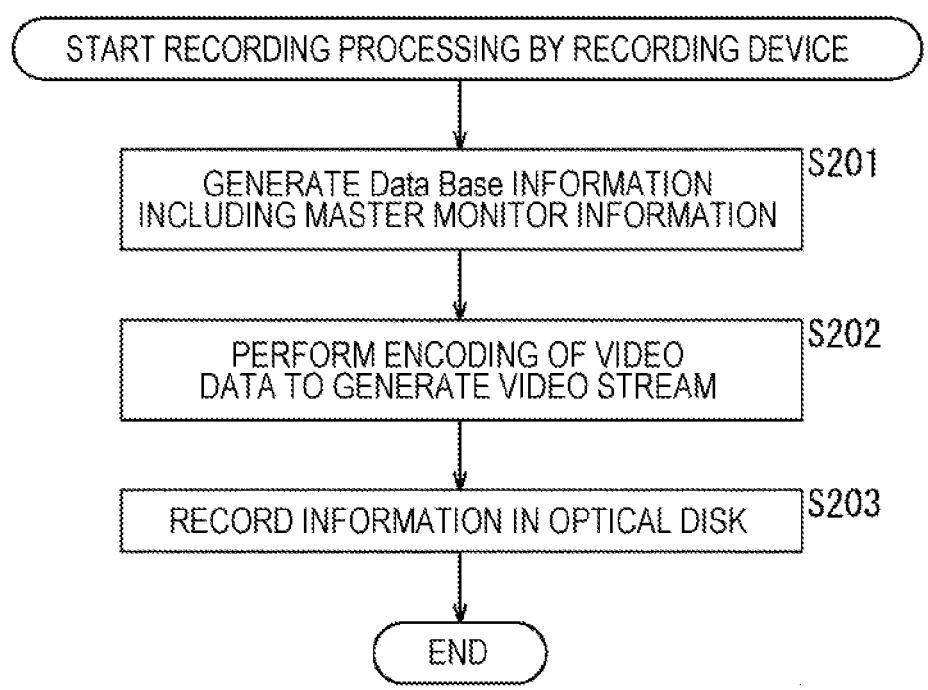
FIG. 44 is a flowchart illustrating recording processing performed by the recording device.

Next, recording processing performed by the recording device 201 will be described with reference to the flowchart of FIG. 44. The processing illustrated in FIG. 44 is started when master video data is input to the recording device 201 via a network or a predetermined recording medium.

In step S201, the Data Base information generation unit 211A generates Data Base information including the master monitor information.

In step S202, the encoding processing unit 212 encodes the input video data according to a format such as HEVC, and generates a video stream.

In step S203, the disk drive 213 records, on the optical disc 11, the Data Base information supplied from the controller 211 and a file storing the video stream supplied from the encoding processing unit 212, and terminates the processing.

Configuration Example of Computer

A series of processing described above can be executed by hardware, or can be executed by software. In a case where the series of processing is executed by software, a program constituting the software is installed into a computer incorporated in dedicated hardware, a general-purpose personal computer, or the like from a program recording medium.

Figure 45:
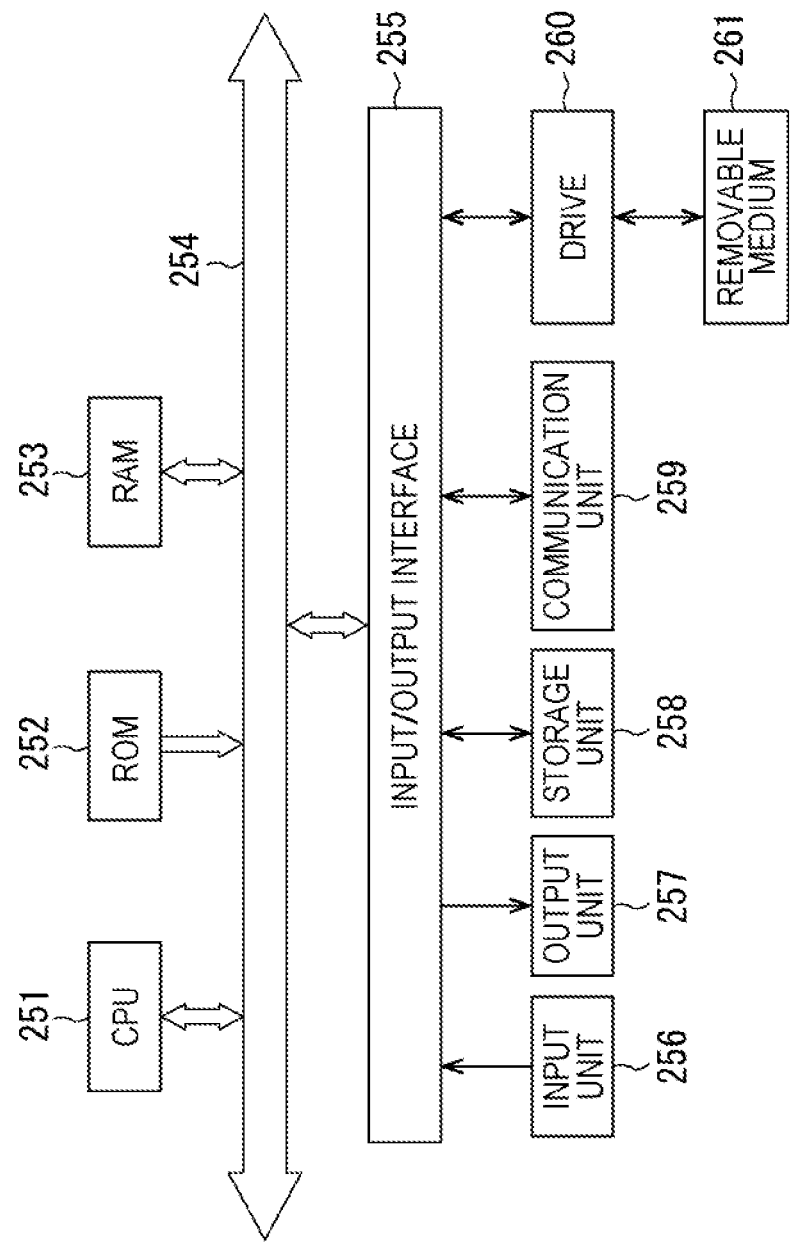
FIG. 45 is a block diagram illustrating a configuration example of a computer.

FIG. 45 is a block diagram illustrating a hardware configuration example of a computer that executes the above-mentioned series of processing by a program.

A central processing unit (CPU) 251, a read only memory (ROM) 252, and a random access memory (RAM) 253 are connected to each other by a bus 254.

An input/output interface 255 is also connected to the bus 254. An input unit 256, which is composed of a keyboard, a mouse, and the like, and an output unit 257 which is composed of a display, a speaker, and the like are connected to the input/output interface 255. Further, a storage unit 258 which is composed of a hard disk, a non-volatile memory, and the like, a communication unit 259 which is composed of a network interface and the like, and a drive 260 that drives a removable medium 261 are connected to the input/output interface 255.

In the computer having the configuration as described above, the CPU 251 loads, a program stored in the storage unit 258, into the RAM 253 via the input/output interface 255 and the bus 254 and executes the program, thereby performing the above-mentioned series of processing.

The program executed by the CPU 251 is recorded on, for example, the removable medium 261, or is provided via a wired or wireless transfer medium, such as a local area network, the Internet, or digital broadcasting, and is installed into the storage unit 258.

Note that the program executed by the computer may be a program for performing processing in chronological order in the sequence described herein, or may be a program for performing processing in parallel or at a necessary timing when calling is performed.

The embodiments of the present technology are not limited to the above embodiments and can be modified in various ways without departing from the scope of the present technology.

For example, the present technology can employ a cloud computing configuration in which one function is shared in cooperation with a plurality of devices via a network.

Further, each step described in the above-described flowcharts can be executed by one device, or can be executed by a plurality of devices in a sharing manner.

Further, in a case where one step includes a plurality of processings, the plurality of processings included in the one step can be executed by one device, or can be executed by a plurality of devices in a sharing manner.

Note that the term "system" described herein refers to a set of a plurality of components (a device, a module (component) etc.), all the components are not necessarily included in the same housing. Accordingly, a plurality of devices that are housed in separate housings and are connected via a network, and one device in which a plurality of modules is housed in one housing are each referred to as a system.

The advantageous effects described herein are illustrated by way of example only and are not limited to the above advantageous effects, and other advantageous effects may be obtained.

[Example of Combinations of Configurations]

The present technology can employ the following configurations.

(1) A reproduction device including:

a readout unit configured to read out, from a recording medium recording a content, a file of a video stream and a file of reproduction management information used for reproducing the video stream and including monitor information indicating at least one of a color gamut and a dynamic range of luminance of a master monitor used for authoring the video stream;

a decoding unit configured to decode the video stream; and an output unit configured to control an output of video data obtained by decoding the video stream and the monitor information included in the reproduction management information to a display device, depending on a performance of the display device to which the content is output.

(2) The reproduction device according to (1), in which in a case where the display device is a device that is compatible with processing for the monitor information output from the reproduction device, the output unit outputs the monitor information, as well as the video data, to the display device.

(3) The reproduction device according to (1) or (2), in which in a case where the display device is a device that is not compatible with processing for the monitor information output from the reproduction device, the output unit outputs the video data to the display device, or outputs the processed video data obtained by performing predetermined processing on the video data to the display device.

(4) The reproduction device according to (3), further including a color gamut conversion unit configured to convert video data obtained by decoding the video stream into video data with a reduced color gamut, in a case where a color gamut indicated by the monitor information is wider than a color gamut of a display unit included in the display device, in which the output unit outputs, to the display device, the processed video data on which processing is performed by the color gamut conversion unit as the predetermined processing.

(5) The reproduction device according to (3), further including:

a dynamic range conversion unit configured to convert video data obtained by decoding the video stream into video data with a reduced dynamic range of a luminance, in a case where a dynamic range of luminance indicated by the monitor information is wider than a dynamic range of luminance of a display unit included in the display device, in which the output unit outputs, to the display device, the processed video data on which processing is performed by the dynamic range conversion unit as the predetermined processing.

(6) The reproduction device according to any of (1) to (5), in which the reproduction management information includes a flag indicating whether or not the monitor information is included in the video stream, and the reproduction device further includes:

an acquisition unit configured to acquire the monitor information from the video stream in a case where the flag indicates that the monitor information is included in the video stream; and a control unit configured to perform processing on the basis of the monitor information acquired by the acquisition unit, of the monitor information acquired by the acquisition unit and the monitor information included in the reproduction management information.

(7) The reproduction device according to any of (1) to (6), in which the recording medium is a BD-ROM, and the monitor information is included in any one of Index table, PlayList, and Clip Information, the Index table, the PlayList, and the Clip Information being the reproduction management information.

(8) A reproduction method including the steps of:

reading out, by a drive, from a recording medium recording a content, a file of a video stream and a file of reproduction management information used for reproducing the video stream and including monitor information indicating at least one of a color gamut and a dynamic range of luminance of a master monitor used for authoring the video stream;

decoding the video stream by a decoder; and controlling an output of video data obtained by decoding the video stream and the monitor information included in the reproduction management information to a display device, depending on a performance of the display device to which the content is output.

(9) A program for causing a computer to execute processing including the steps of:

reading out, by a drive, from a recording medium recording a content, a file of a video stream and a file of reproduction management information used for reproducing the video stream and including monitor information indicating at least one of a color gamut and a dynamic range of luminance of a master monitor used for authoring the video stream;

decoding the video stream by a decoder; and controlling an output of video data obtained by decoding the video stream and the monitor information included in the reproduction management information to a display device, depending on a performance of the display device to which the content is output.

REFERENCE SIGNS LIST

1 Reproduction device
2 Display device
11 Optical disc
51 Controller
52 Disk drive
53 Memory
56 Decoding processing unit
58 Communication unit
71 Readout control unit
72 Master monitor information acquisition unit
73 Decoding control unit
74 Display information acquisition unit
81 Decoding unit
82 Dynamic range conversion unit
83 Color gamut conversion unit
84 Output unit

The invention claimed is:

1. A receiving device comprising:
a receiving unit configured to receive video, a first monitor information indicating maximum luminance of a master monitor used for authoring the video and a second monitor information indicating maximum luminance of the master monitor, and
a processing unit configured to process the video and one of the first monitor information or the second monitor information.

2. The receiving device according to claim 1, wherein the processing unit is configured to output the video and the one of the first monitor information or the second monitor information to a display that is compatible with processing for the monitor information.

3. The receiving device according to claim 1, wherein the processing unit is configured to output the video and to output neither the first monitor information nor the second monitor information to a display that is not compatible with processing for the monitor information.

4. The receiving device according to claim 1, wherein the first monitor information is included in the video and the second monitor information is included in Data Base information, and
the processing unit is configured to process the video and the first monitor information.

5. The receiving device according to claim 1, wherein the receiving unit is configured to receive display information from a display, and
the processing unit is configured to output the video and the one of the first monitor information or the second monitor information to the display based on the display information.

6. A receiving device comprising:
circuitry configured to:
receive a video a first monitor information indicating maximum luminance of a master monitor used for authoring the video and a second monitor information indicating maximum luminance of the master monitor, and
process the video and one of the first monitor information or the second monitor information.

7. The receiving device according to claim 6, wherein the circuitry is configured to output the video and the one of the first monitor information or the second monitor information to a display that is compatible with processing for the monitor information.

8. The receiving device according to claim 6, wherein the circuitry is configured to output the video and to output neither the first monitor information nor the second monitor information to a display that is not compatible with processing for the monitor information.

9. The receiving device according to claim 6, wherein the first monitor information is included in the video and the second monitor information is included in Data Base information, and the circuitry is configured to process the video and the first monitor information.

10. The receiving device according to claim 6, further comprising a receiving unit configured to receive display information from a display, and
the circuitry is configured to output the video and the one of the first monitor information or the second monitor information to the display based on the display information.

11. A video processing method comprising:
receiving a video, first monitor information indicating maximum luminance of a master monitor used for authoring the video and second monitor information indicating maximum luminance of the master monitor, and
processing the video and one of the first monitor information or the second monitor information.

12. The method according to claim 11, further comprising outputting the video one of the first monitor information or the second monitor information to a display that is compatible with processing for the monitor information.

13. The method according to claim 11, further comprising outputting the video and only outputting the first monitor information or the second monitor information to a display that is compatible with processing for the monitor information.

14. The receiving device according to claim 11, wherein the first monitor information is included in the video and the second monitor information is included in Data Base information.

15. The receiving device according to claim 11, further comprising displaying information from a display, and outputting the video and the one of the first monitor information or the second monitor information to the display based on the display information.

* * * * *